United States Patent
Cho et al.

(10) Patent No.: US 11,070,996 B2
(45) Date of Patent: Jul. 20, 2021

(54) METHOD FOR CONTROLLING WIRELESS LINK AND WIRELESS CONNECTION OF TERMINAL IN WIRELESS COMMUNICATION SYSTEM, AND APPARATUS SUPPORTING SAME

(71) Applicant: LG Electronics Inc., Seoul (KR)

(72) Inventors: Heejeong Cho, Seoul (KR); Jiwon Kang, Seoul (KR); Heejin Kim, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/473,221

(22) PCT Filed: Dec. 23, 2016

(86) PCT No.: PCT/KR2016/015243
§ 371 (c)(1),
(2) Date: Jun. 24, 2019

(87) PCT Pub. No.: WO2018/117313
PCT Pub. Date: Jun. 28, 2018

(65) Prior Publication Data
US 2019/0357065 A1 Nov. 21, 2019

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
CPC ... H04L 1/0026; H04L 1/0031; H04L 5/0035; H04L 2025/03426; H04W 24/08;
(Continued)

(56) References Cited

U.S. PATENT DOCUMENTS

2005/0239510 A1* 10/2005 Cho ............... H04W 36/06
455/562.1
2006/0281461 A1* 12/2006 Kwun ............. H04W 28/18
455/436

(Continued)

FOREIGN PATENT DOCUMENTS

WO WO2016163841 10/2016

OTHER PUBLICATIONS

Extended European Search Report in European Appln No. 16924599.0, dated Jun. 19, 2020, 134 pages.

*Primary Examiner* — Kan Yuen
(74) *Attorney, Agent, or Firm* — Fish & Richardson P.C.

(57) ABSTRACT

Disclosed herein is a method and apparatus for a device to perform a measurement in a wireless communication system. According to the present invention, it may be provided the method and apparatus including receiving, from a base station, a request message requesting capability information of the device; transmitting, to the base station, a response message including the capability information; receiving first configuration information for a measurement configuration for two or more radio units included in the device based on the capability information, and the radio unit represents a unit available to perform transmission and reception of a signal and a measurement of signal strength individually; measuring a serving cell and neighboring cells through the plurality of radio units; and transmitting, to the base station, a reporting message including measurement information measuring the serving cell and the neighboring cells.

15 Claims, 26 Drawing Sheets

(58) Field of Classification Search
CPC ..... H04W 24/10; H04W 36/00; H04W 36/30; H04W 8/22; H04W 8/24
See application file for complete search history.

(56) References Cited

U.S. PATENT DOCUMENTS

| | | | |
|---|---|---|---|
| 2012/0021693 A1* | 1/2012 | Wintzell | H04B 7/0874 455/67.11 |
| 2013/0242796 A1 | 9/2013 | Chen et al. | |
| 2014/0044003 A1 | 2/2014 | Drazynski et al. | |
| 2014/0112184 A1* | 4/2014 | Chai | H04L 1/0026 370/252 |
| 2014/0226623 A1 | 8/2014 | Seo et al. | |
| 2014/0357275 A1 | 12/2014 | Quan et al. | |
| 2015/0043367 A1* | 2/2015 | Kim | H04W 24/02 370/252 |
| 2016/0156392 A1* | 6/2016 | Jung | H04W 8/24 370/338 |
| 2017/0077975 A1* | 3/2017 | Wang | H04B 1/3816 |
| 2018/0199225 A1* | 7/2018 | Kim | H04W 84/12 |
| 2019/0123800 A1* | 4/2019 | Takeda | H04L 5/0087 |

\* cited by examiner

FIG. 5
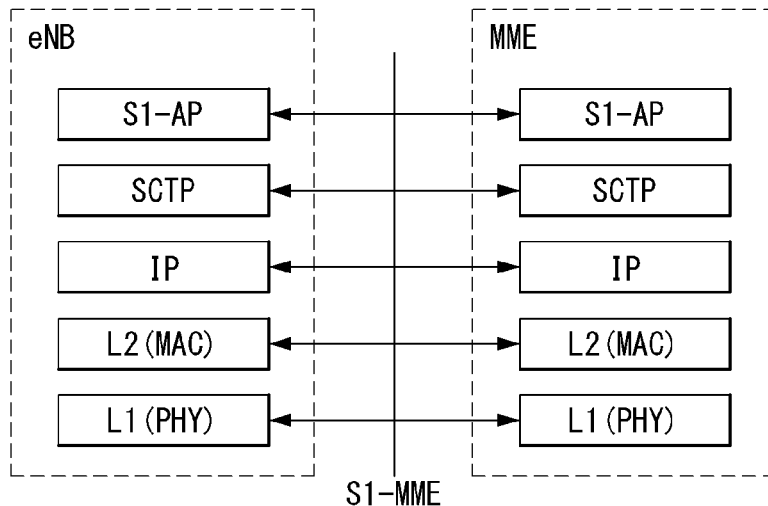
(a) control-plane protocol stack
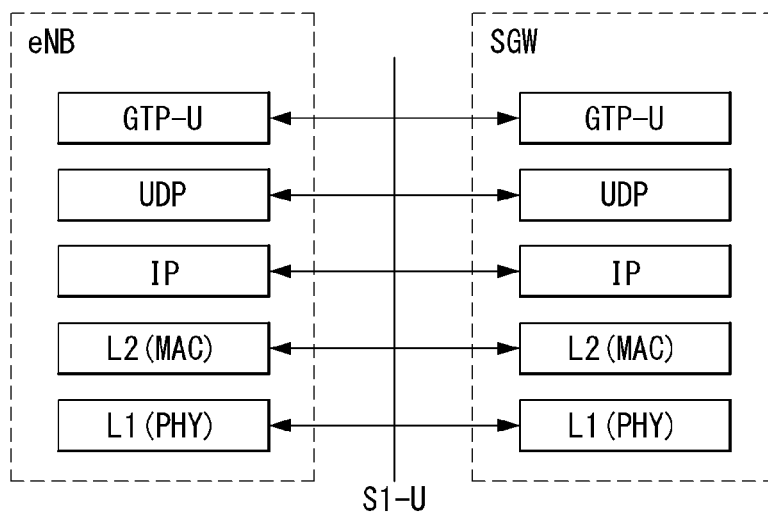
(b) user-plane protocol stack

METHOD FOR CONTROLLING WIRELESS LINK AND WIRELESS CONNECTION OF TERMINAL IN WIRELESS COMMUNICATION SYSTEM, AND APPARATUS SUPPORTING SAME

CROSS-REFERENCE TO RELATED APPLICATIONS

This application is a National Stage application under 35 U.S.C. § 371 of International Application No. PCT/KR2016/015243, filed on Dec. 23, 2016. The disclosure of the prior application is incorporated by reference in its entirety.

TECHNICAL FIELD

The present invention relates to a method for controlling a radio link and a wireless connection of a terminal a wireless communication system and, more particularly, to a method and apparatus for controlling a radio link and a wireless connection of a terminal based on a measurement result of a radio signal measured by the terminal.

Background Art

Mobile communication systems have been developed to provide voice services while guaranteeing user mobility. Such mobile communication systems have expanded their coverage from voice services through data services up to high-speed data services. However, as current mobile communication systems suffer resource shortages and users demand even higher-speed services, the development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as dual connectivity, massive Multiple Input Multiple Output (MIMO), in-band full duplex, non-orthogonal multiple access (NOMA), supporting super-wide band, and device networking, have been researched.

DISCLOSURE

Technical Problem

A wireless communication system should be able to support a high capacity service (e.g., immersive media), a low latency high reliability service (e.g., safety) and the like to various types of terminals of large communication devices such as a vehicle and a drone as well as the conventional personal mobile communication device.

As a method for fulfill the requirements of the service, it may be considered the multiple antenna technology that may obtain spatial multiplexing and diversity gain. Particularly, the large communication device of which spatial restriction is not so greater than the conventional personal mobile communication device may have more antennas. However, considering prevention of communication loss owing to breakdown due to beauty/aerodynamics and accident, it is required a method of distributing antennas and performing transmission and reception independently by the antennas.

In addition, it is required a method for controlling multiple distributed antennas that perform transmission and reception independently.

Technical objects to be achieved in the present invention are not limited to the above-described technical objects, and other technical objects not described above may be evidently understood by a person having ordinary skill in the art to which the present invention pertains from the following description.

Technical Solution

In order to solve the problem described above, the present invention provides a method and apparatus for a device to perform a measurement in a wireless communication system.

Particularly, it is provided the method including receiving, from a base station, a request message requesting capability information of the device; transmitting, to the base station, a response message including the capability information; receiving first configuration information for a measurement configuration for two or more radio units included in the device based on the capability information, and the radio unit represents a unit available to perform transmission and reception of a signal and a measurement of signal strength individually; measuring a serving cell and neighboring cells through the plurality of radio units; and transmitting, to the base station, a reporting message including measurement information measuring the serving cell and the neighboring cells.

In addition, in the present invention, the capability information includes at least one of radio access technology (RAT)-type, whether the device includes a plurality of radio units, the number of the radio units and information related to each of the radio units.

In addition, in the present invention, the information includes at least one of an index of the radio unit, whether to activate radio link or wireless connection, a category, physical layer or Radio Frequency (RF) parameter.

In addition, in the present invention, the configuration information includes at least one of a condition for transmitting the measurement information for each of the radio units to the base station, a transmission period of the measurement information or whether the measurement information is transmitted together with the measurement information of another radio unit.

In addition, in the present invention, the reporting message is transmitted by each of the radio units separately.

In addition, in the present invention, the reporting message is transmitted by one of the two or more radio units, and the measurement information includes an index for each of the radio units and a measurement value according to the index.

In addition, in the present invention, a part of the two or more radio units is in radio link connected state, and the remaining radio unit is in radio link released state.

In addition, the present invention further includes performing handover to at least one target cell among the neighboring cells based on the measurement information.

In addition, in the present invention, the two or more radio units perform handover to a same target cell among the at least one target cell.

In addition, in the present invention, the step of performing handover further includes receiving, from the base station, second configuration information for a wireless connection with the target cell, and the second configuration information includes at least one of a control scheme for the two or more radio units, an index for a radio unit to be switched to a connected state of radio link, an index for a radio unit to be switched to a released state of radio link, target cell information, random access information or environmental configuration information for each of the radio units.

In addition, in the present invention, the step of performing handover further includes performing, by one of the two or more radio units, a random-access procedure with the target cell, and the remaining radio units among the two or more radio units does not perform a random-access procedure with the target cell.

In addition, the present invention further includes performing, by a first radio unit among the two or more radio units, handover to a first target cell based on the measurement information; and performing, by a second radio unit among the two or more radio units, handover to a second target cell based on the measurement information.

In addition, in the present invention, the step of performing handover to the first target cell further includes receiving second configuration information for a wireless connection with the first target cell, and the second configuration information includes at least one of a control scheme for the two or more radio units, an index for a radio unit to be switched to a connected state of radio link, an index for a radio unit to be switched to a released state of radio link, target cell information, random access information, whether to start a control message for the wireless connection, a transmission timing of the control message, whether to start transmission and reception of data with the first target cell, a starting timing of transmission and reception of data or information for the transmission and reception of data.

In addition, in the present invention, the step of performing handover to the second target cell further includes receiving second configuration information for a wireless connection with the second target cell through the second radio unit, and the second configuration information includes at least one of a control scheme for the two or more radio units, an index for a radio unit to be switched to a connected state of radio link, an index for a radio unit to be switched to a released state of radio link, target cell information, random access information, whether to start a control message for the wireless connection, a transmission timing of the control message, whether to start transmission and reception of data with the second target cell, a starting timing of transmission and reception of data or information for the transmission and reception of data.

In addition, in the present invention, it is provided a device for performing a measurement in a wireless communication system including two or more radio units available to perform transmission and reception of a radio signal and a measurement of signal strength individually; and a processor functionally connected with the two or more radio units to control the two or more radio units, and the processor is configured to control to: receive, from a base station, a request message requesting capability information of the device; transmit, to the base station, a response message including the capability information; receive first configuration information for a measurement configuration for two or more radio units included in the device based on the capability information, and the radio unit represents a unit available to perform transmission and reception of a signal and a measurement of signal strength individually; measure a serving cell and neighboring cells through the plurality of radio units; and transmit, to the base station, a reporting message including measurement information measuring the serving cell and the neighboring cells.

Advantageous Effects

According to the present invention, data may be transmitted and received separately through multiple antennas that perform transmission and reception independently, data transmission rate may be improved.

In addition, according to the present invention, a radio link and a wireless connection of multiple antennas are controlled separately, and even in the case of a radio link and a wireless connection of a part of antennas are released, data is transmitted and received through the remaining antennas, and accordingly, data may be transmitted and received without a discontinuity of data transmission.

In addition, according to the present invention, handover is performed by performing a measurement independently by each of multiple antennas, and accordingly, interrupt time may be reduced.

The effects which may be obtained in the present invention are not limited to the above-described effects, and other technical effects not described above may be evidently understood by a person having ordinary skill in the art to which the present invention pertains from the following description.

DESCRIPTION OF DRAWINGS

FIG. 5 is a diagram illustrating a structure of an S1 interface protocol in a wireless communication system to which the present invention may apply.

MODE FOR INVENTION

Figure 1:
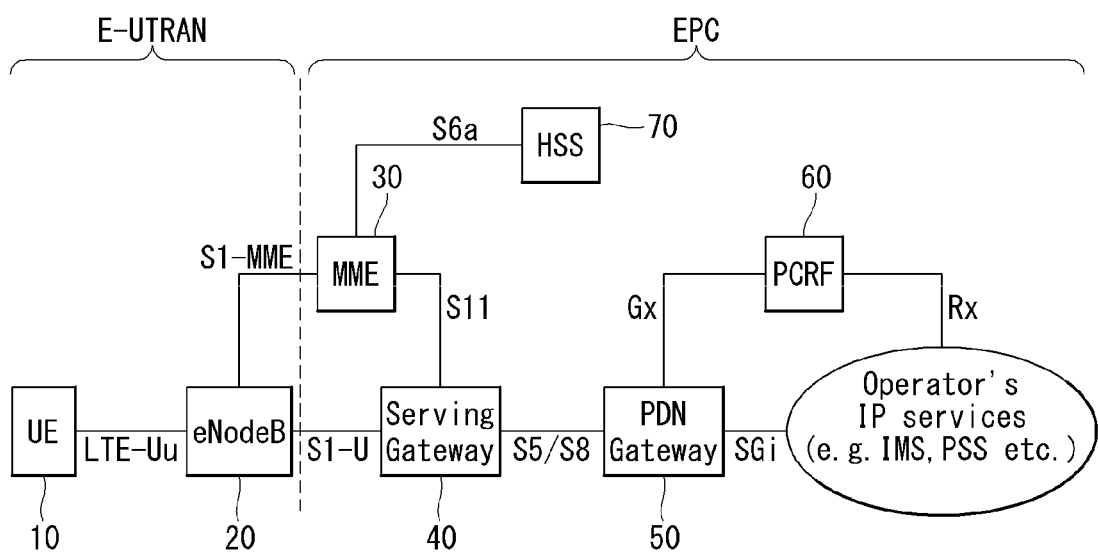
FIG. 1 is a view illustrating an Evolved Packet System which is associated with the Long Term Evolution (LTE) system to which the present invention may apply.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a UE node of a network, which directly communicates with the UE. In some cases, a specific operation described as performed by the eNB may be performed by an upper node of the eNB. Namely, it is apparent that, in a network comprised of a plurality of network nodes including an eNB, various operations performed for communication with a UE may be performed by the eNB, or network nodes other than the eNB. The term 'eNB' may be replaced with the term 'fixed station', 'base station (BS)', 'Node B', 'base transceiver system (BTS),', 'access point (AP)', etc.

The term 'user equipment (UE)' may be replaced with the term 'UE', 'mobile station (MS)', 'user UE (UT)', 'mobile subscriber station (MSS)', 'subscriber station (SS)', 'Advanced Mobile Station (AMS)', 'Wireless UE (WT)', 'Machine-Type Communication (MTC) device', 'Machine-to-Machine (M2M) device', 'Device-to-Device(D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be supported by standard documents disclosed by at least one of IEEE 802, 3GPP and 3GPP2 which are wireless access systems. That is, in order to clearly disclose the inventive concept of the present invention, steps or parts which are not described herein in the embodiments of the present invention may be supported by the documents. In addition, all terms disclosed in this document may be described by the standard document.

To clear the description, the present invention is mainly described with 3GPP LTE/LTE-A, but the technical feature of the present invention is not limited thereto and may also be applied to 5G system.

Prior to going further to the description taken in conjunction with the drawings, the terms used herein are briefly defined for ease of understanding.

EPS: abbreviation of Evolved Packet System. Means a core network supporting a long term evolution (LTE) network. An evolved network of UMTS.

PDN (public data network): independent network where a servicing server is positioned.

APN (access point name): Name of an access point managed by a network, which is provided to UE. That is, the name of PDN (character string). Based on the name of the access point, a PDN for transmission/reception of data is determined.

TEID (tunnel endpoint identifier): End point ID of a tunnel configured between nodes in a network, configured per period on a per UE bearer basis.

MME: abbreviation of Mobility Management Entity. Functions to control each entity in the EPS to provide mobility and session for the UE.

Session: path for data transmission, and its unit may be PDN, bearer, or IP flow.

The differences between the units may be divided into an overall target network unit (APN or PDN unit), a unit separated with QoS therein (bearer unit), and a destination IP address unit as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway Service Data Flow (SDF): IP flow of a user traffic or combination of a plurality of IP flows which is classified according to a service type.

PDN connection: refers to connection from a UE to PDN, i.e., correlation (connection) between a UE represented in an IP address and PDN represented in APN. This means connection (UE-PDN GW) between entities in the core network so that the session may be formed.

UE context: circumstance information of UE used to manage the UE in the network. That is, circumstance information consisting of UE id, mobility (e.g., current position), or attribute of session (QoS, priority, etc.).

TIN: Temporary Identity used in Next update

P-TMSI: Packet Temporary Mobile Subscriber

TAU: Tracking Area Update

GBR: Guaranteed Bit Rate

GTP: GPRS Tunneling Protocol

TEID: Tunnel Endpoint ID

GUTI: Globally Unique Temporary Identity, UE identify known to MME

FIG. 1 is a view illustrating an Evolved Packet System which is associated with the Long Term Evolution (LTE) system to which the present invention may apply.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE 10 and the CN. The protocols running between the UE 10 and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE 10, and is handled by the connection or mobility management layer in the NAS protocol layer.

In the present invention, the MME 30 corresponds to an entity in which a function necessary to process authentication of the UE and context information is implemented, where the MME 30 is described as an embodiment of the entity. Therefore, other devices in addition to the MME 30 may also perform the corresponding function.

The S-GW 40 serves as the local mobility anchor for the data bearers when the UE 10 moves between eNodeBs 20. All user IP packets are transferred through the S-GW 40. The S-GW 40 also retains information about the bearers when the UE 10 is in idle state (known as ECM-IDLE) and temporarily buffers downlink data while the MME 30 initiates paging of the UE 10 to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as an embodiment of the entity. Therefore, other devices in addition to the S-GW 40 may also perform the corresponding function.

The P-GW 30 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as an embodiment of the entity. Therefore, other devices in addition to the P-GW 50 may also carry out the corresponding function.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, Sha, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
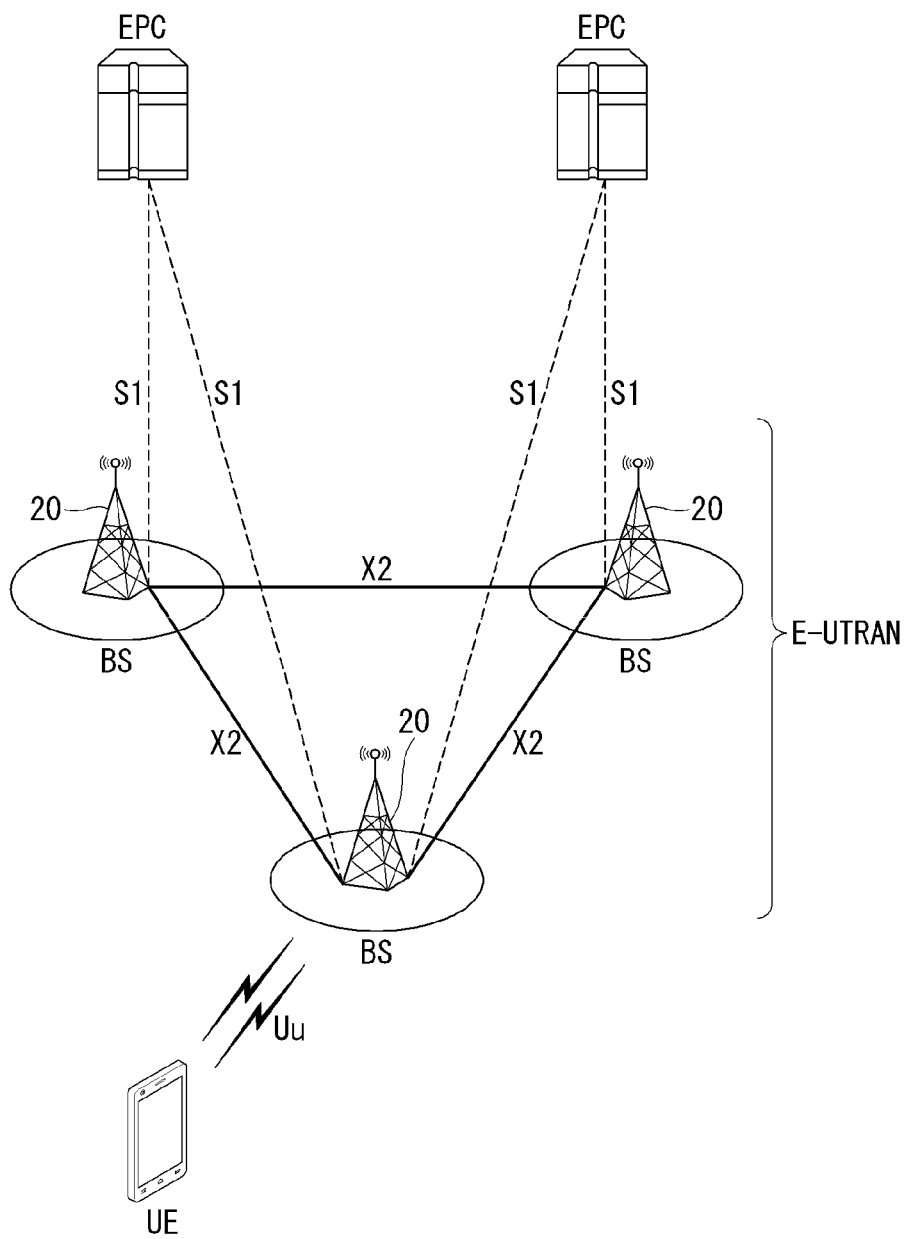
FIG. 2 illustrates a wireless communication system to which the present invention applies.

FIG. 2 illustrates a wireless communication system to which the present invention applies.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10.

The base stations 20 are interconnected by means of an X2 interface. The base stations 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the base station.

Figure 3:
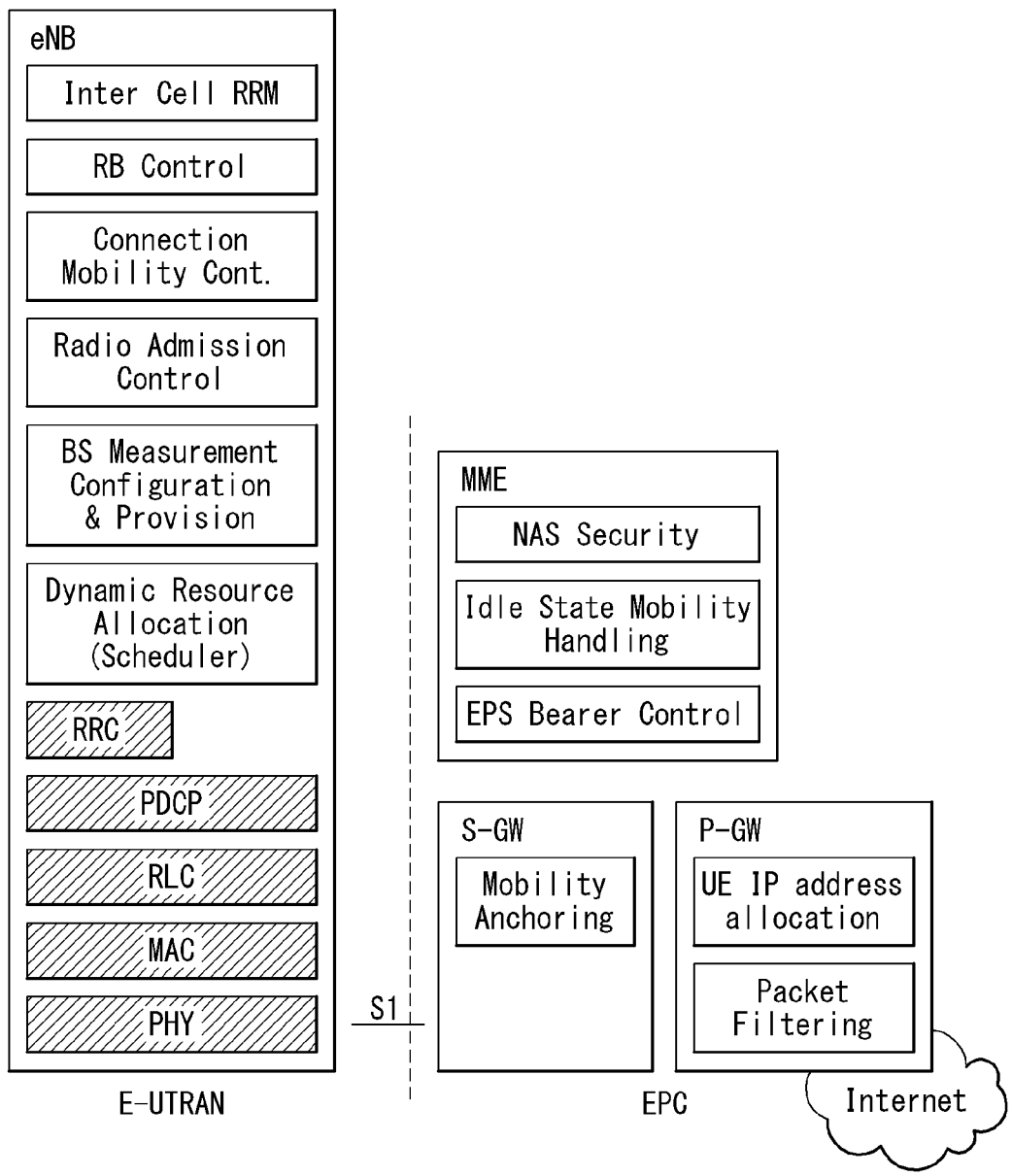
FIG. 3 illustrates a functional split of an E-UTRAN and an EPC to which the present invention may apply.

FIG. 3 illustrates a functional split of an E-UTRAN and an EPC to which the present invention may apply.

Referring to the FIG. 3, shaded blocks represent radio protocol layers, and empty blocks represent functional entities of the control plane.

The base station performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and establishing a measurement report.

An MME performs the following functions: (1) distribution of paging messages to base stations; (2) security control; (3) idle state mobility control; (4) S bearer control; (5) ciphering and integrity protection of NAS (Non-Access Stratum) signaling.

The S-GW performs the following functions: (1) termination of a user plane packet with respect to paging; and (2) user plane switching to support UE mobility.

Figure 4:
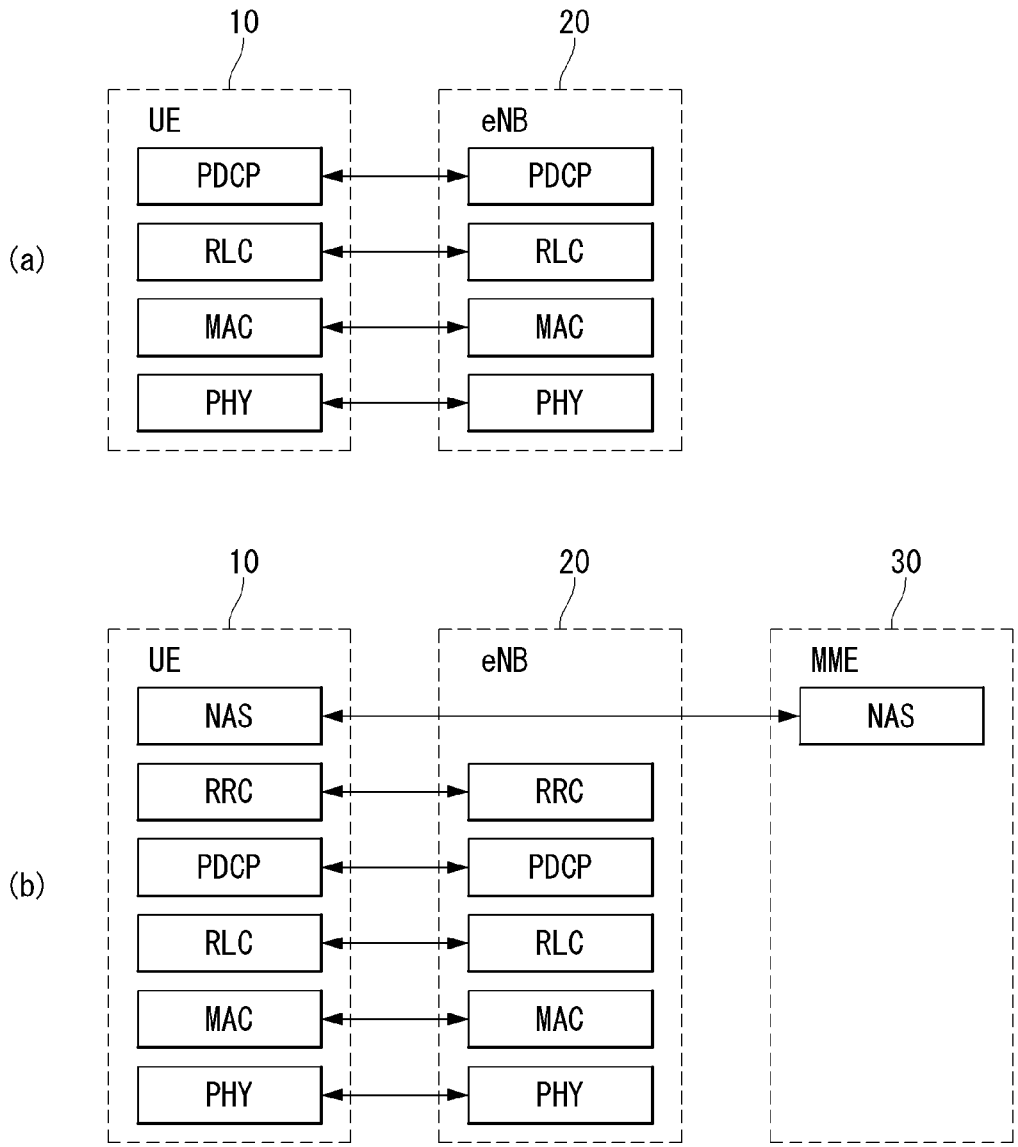
FIG. 4 is a diagram illustrating a radio protocol architecture to which technical features of the present specifications are applicable.

FIG. 4 is a diagram illustrating a radio protocol architecture to which technical features of the present specifications are applicable.

FIG. 4A shows an example of a radio protocol architecture for a user plane, and FIG. 4B shows an example of a radio protocol structure for a control plane.

The user plane is a protocol stack for transmitting user data, and the control plane is a protocol stack for transmitting control signals.

Referring to FIGS. 4($a$) and 4($b$), a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 5 illustrates an S1 interface protocol structure in a wireless communication system to which the present invention may apply.

(a) of FIG. 5 illustrates the control plane protocol stack in the S1 interface, and (b) of FIG. 5 illustrates the user plane interface protocol structure in the S1 interface.

With reference to FIG. 5, the S1 control plane interface (S1-MME) is defined between the eNB and the MME. The transport network layer is built on IP transport, similarly to the user plane, but for the reliable transport of signaling messages SCTP is added on top of IP. The application layer signaling protocol is referred to as S1-AP (S1 Application Protocol).

The SCTP layer provides guaranteed delivery of application layer messages.

The transport IP layer employs point-to-point transmission for Protocol Data Unit (PDU) signaling transmission.

For each S1-MME interface instance, a single SCTP association uses a pair of stream identifiers for the S1-MME common procedure.

Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure.

The MME communication context identifier and the eNB communication context identifier are used for identifying UE-specific S1-MME signaling transmission bearer. The communication context identifier is delivered within each S1-AP message.

If the S1 signaling transport layer notifies the S1AP layer of disconnection of signaling, the MME changes the state of the UE which has used the corresponding signaling connection to ECM-IDLE state. Furthermore, the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

Figure 6:
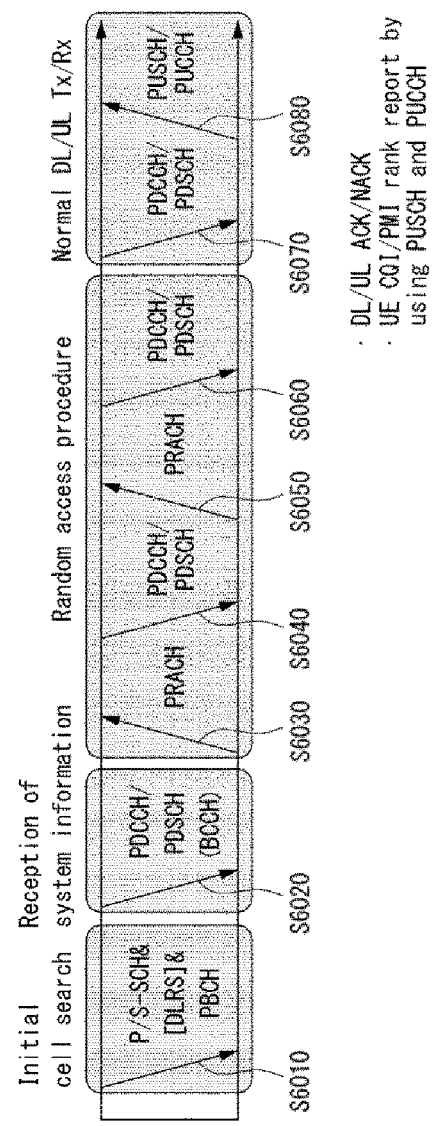
FIG. 6 illustrates physical channels used for the 3GPP LTE/LTE-A system to which the present invention can be applied and a general signal transmission method using the physical channels.

FIG. 6 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S6010 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S6020 step to obtain more specific system information.

Next, the UE may carry out a random access procedure such as the steps of S6030 to S6060 to complete a connection process to the eNB. To this purpose, the UE transmits a preamble S6030 through a physical random access channel (PRACH) and receives a response message in response to the preamble through a PDSCH corresponding to the PRACH S6040. In the case of contention-based random access, the UE may carry out a contention resolution procedure including transmission of an additional PRACH signal S6050 and reception of a PDCCH signal and the PDSCH signal corresponding to the PDCCH signal S6060.

Afterwards, the UE which has carried out the procedure above may carry out reception S6070 of the PDCCH signal and/or PDSCH signal and transmission S6080 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Hereinafter, the RRC state and RRC connection method of a terminal is described in detail.

The RRC state means whether the RRC layer of a terminal has been logically connected to the RRC layer of an E-UTRAN. A case where the RRC layer has been connected is called an RRC connected state, and a case where the RRC layer has not been connected is called an RRC idle state. A terminal in the RRC connected state has an RRC connection, and thus an E-UTRAN may check the presence of the corresponding terminal in a cell unit, thus being capable of effectively controlling the terminal.

In contrast, a terminal in the RRC idle state cannot be checked by an E-UTRAN and is managed by a core network (CN) in a tracking area unit, that is, an area unit greater than a cell. That is, whether the terminal in the RRC idle state is present in a large area unit is checked. In order to receive a common mobile communication service, such as voice or data, the terminal needs to switch to the RRC connected state.

When a user first turns on a terminal, the terminal first searches for a proper cell and then stays in the RRC idle state in the corresponding cell. When the terminal in the RRC idle state needs to set up an RRC connection, it establishes the RRC connection with an E-UTRAN through an RRC connection procedure and switches to the RRC connected state. A case where the terminal in the RRC idle state needs to establish an RRC connection includes several cases, and may include the necessity of uplink data transmission for a reason, such as a call attempt by a user, for example, or response message transmission when a paging message is received from an E-UTRAN.

A non-access stratum (NAS) layer located over the RRC layer performs the functions of session management and mobility management.

In order to manage the mobility of a terminal in the NAS layer, two types of state; such as EPS Mobility Management-REGISTERED (EMM-REGISTERED) and EMM-DEREGISTERED have been defined. The two states are applied to the terminal and the MME. Initially, the terminal is in the EMM-DEREGISTERED state. The terminal performs a process of registering with a corresponding network through an initial attach procedure in order to access a network. When the attach procedure is successfully performed, the terminal and the MME become the EMM-REGISTERED state.

In order to manage a signaling connection between a terminal and an EPC, two states of an EPS connection management (ECM)-IDLE state and an ECM-CONNECTED state have been defined. The two states are applied to the terminal and the MME. When the terminal in the ECM-IDLE state sets up an RRC connection with an E-UTRAN, the corresponding terminal becomes the ECM-CONNECTED state.

When the MME in the ECM-IDLE state sets up an S1 connection with the E-UTRAN, it becomes the ECM-CONNECTED state. When the terminal is in the ECM-IDLE state, the E-UTRAN does not have context information of the terminal. Accordingly, the terminal in the ECM-IDLE state performs a terminal-based mobility-related procedure, such as cell selection or cell reselection, without a command from a network. In contrast, when the terminal is in the ECM-CONNECTED state, the mobility of the terminal is managed by a command from the network. If the location of the terminal in the ECM-IDLE state is different from that known to the network, the terminal notifies the network of the corresponding location of the terminal through a tracking area update procedure.

System information is described below.

System information includes essential information that must be known to a terminal in order for the terminal to access a base station. Accordingly, the terminal must have received all of pieces of system information before it accesses the base station and must always have the newest system information. Furthermore, the system information is information that must be known to all of terminals within one cell, and a base station periodically transmits the system information.

In accordance with Paragraph 5.2.2 of 3GPP TS 36.331 V8.7.0 (2009-09) "Radio Resource Control (RRC); Protocol specification (Release 8)", system information is divided into a master information block (MIB), a scheduling block (SB), and a system information block (SIB). The MIB allows a terminal to be aware of the physical configuration, for example, a bandwidth of a corresponding cell. The SB provides notification of transmission information, for example, the transmission cycle of Ms. The SIB is an assembly of pieces of related system information. For example, which SIB includes only information of a neighboring cell, and which SIB includes only information of an uplink radio channel used by a terminal.

EMM and ECM States

EPS Mobility Management (EMM) and EPS Connection Management (ECM) states will be described.

Figure 7:
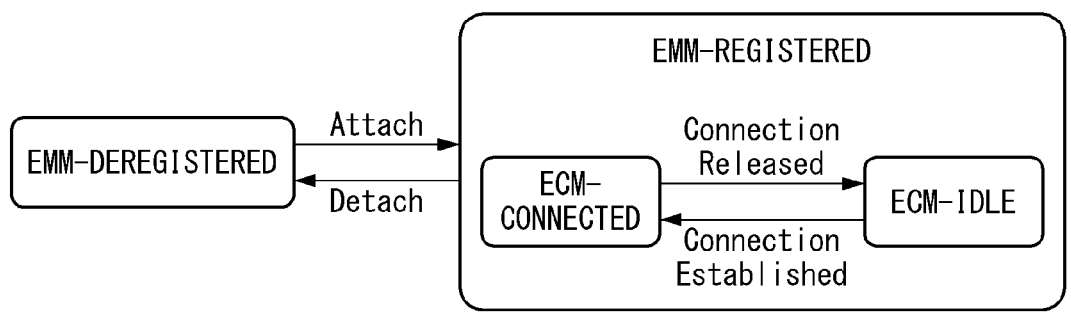
FIG. 7 is a diagram illustrating EMM and ECM states in a wireless communication system to which the present invention may apply.

FIG. 7 illustrates an EMM and ECM states in a wireless communication system to which the present invention may apply.

With reference to FIG. 7, to manage mobility of the UE in the NAS layer defined in the control planes of the UE and the MME, EMM-REGISTERED and EMM-DEREGISTERED states may be defined depending on whether the UE is attached to or detached from a network. The EMM-REGISTERED and the EMM-DEREGISTERED states may be applied to the UE and the MME.

Initially, the UE stays in the EMM-DEREGISTERED state when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Likewise, to manage signaling connection between the UE and the network, ECM-CONNECTED and ECM-IDLE states may be defined. The ECM-CONNECTED and ECM-IDLE states may also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, if RRC layer of the UE is connected to the RRC layer of the eNB, the UE stays in the RRC_CONNECTED state. If the RRC layer of the UE is not connected to the RRC layer of the eNB, the UE stays in the RRC IDLE state.

The network may identify the UE staying in the ECM-CONNECTED state at the level of cell unit and may control the UE in an effective manner.

Meanwhile, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE may receive a broadcast of system information and paging information by monitoring a paging signal at a specific paging occasion for each piece of UE-specific paging DRX cycle.

When the UE is in the ECM-IDLE state, the network does not carry context information of the UE. Therefore, the UE staying in the ECM-IDLE state may perform a mobility-related procedure based on the UE, such as cell selection or cell reselection, without necessarily following an order of the network. If the position of the UE differs from the position recognized by the network while the UE is in the ECM-IDLE state, the UE may inform the network of the corresponding position of the UE through a Tracking Area Update (TAU) procedure.

Meanwhile, when the UE is in the ECM-CONNECTED state, mobility of the UE is managed by an order of the network. While the UE stays in the ECM-CONNECTED state, the network knows to which cell the UE currently belongs. Therefore, the network may transmit and/or receiver data to or from the UE, control mobility of the UE, such as handover, and perform cell measurement with respect to neighboring cells.

As described above, the UE has to make a transition to the ECM-CONNECTED state in order to receive a general mobile communication service, such as a voice or data communication service. When the UE is first powered on, the UE in its initial state stays in the ECM-IDLE state as in the EMM state, and if the UE successfully registers to the corresponding network through an initial attach procedure, the UE and the MME make a transition to the ECM connection state. Furthermore, if UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Figure 8:
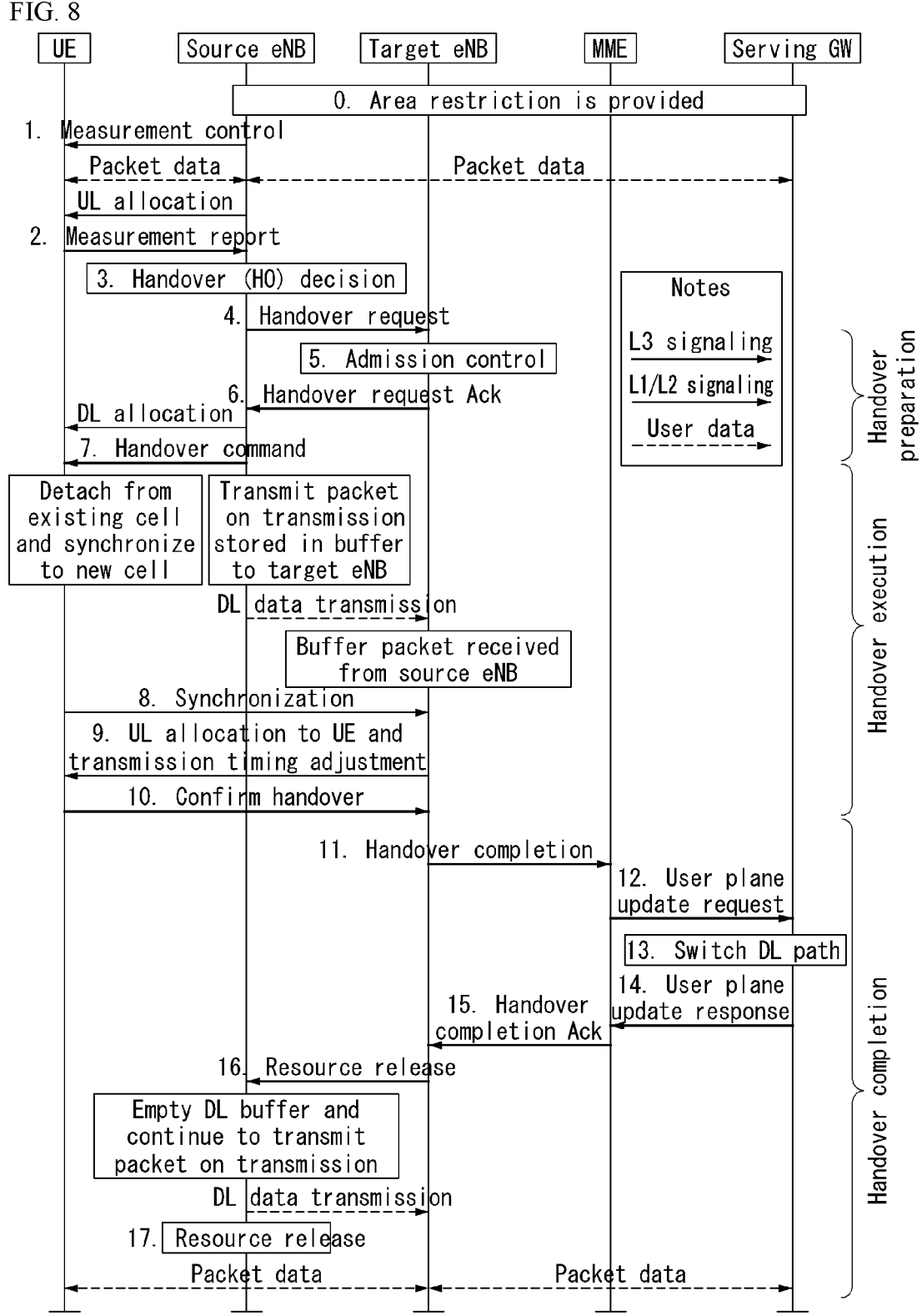
FIG. 8 illustrates a handover procedure defined in LTE (-A).

FIG. 8 illustrates a handover procedure defined in LTE.

FIG. 8 shows a case where the MME and the serving gateway are not changed.

The detailed handover procedure is as follows and the 3GPP TS (Technical Specification) 36.300 may be referred to.

Step 0: The UE context in the source base station (eNB) includes information about the roaming restriction given at connection establishment or recent TA update.

Step 1: The source base station sets up the UE measurement procedure according to the area restriction information. The measurements provided by the source base station may help control the connection mobility of the UE.

Step 2: The UE is triggered to send a measurement report according to the rules set by (system information, etc.).

Step 3: The source base station determines whether to hand over the UE based on measurement report and Radio Resource Management (RRM) information.

Step 4: The source BS transmits information required for the handover (HO) to the target BS through the handover request message. The information required for handover includes a UE X2 signaling context reference, a UE S1 EPC signaling context reference, a target cell ID, an RRC context including an identifier (e.g., a cell radio network temporary identifier (CRNTI) in the source BS.

Step 6: The target base station prepares L1/L2 and HO and transmits a handover request ACKNOWLEDGE message to the source base station. The handover request Ack message includes a transparent container (RRC message) transmitted to the UE for handover. The container includes a new C-RNTI, a security algorithm identifier of the target base station. Further, the container may further include additional parameters such as connection parameters, SIB, and the like.

Also, the target base station divides the RA signatures into a non-contention based RA signature set (hereinafter referred to as group 1) and a competition based RA signature set (hereinafter referred to as group 2) in order to minimize the handover delay, then selects one of the group 1 to inform the handover UE.

That is, the container may further include information regarding the dedicated RA signature. The container may also include information about a RACH slot duration for which a dedicated RA signature is to be used.

Step 7: The source base station generates an RRC message (e.g., RRCConnectionReconfiguration message) having mobility control information for the UE for handover, and transmits the generated RRC message to the UE.

The RRCConnectionReconfiguration message includes a parameter necessary for handover (e.g., a new C-RNTI, a security algorithm identifier of the target base station, and optionally, information on a dedicated RACH signature, target base station SIB, etc.) and commands performance of HO.

Step 8: The source BS transmits a serial number (SN) STATUS TRANSFER message to the target BS to convey the uplink PDCP SN reception status and the downlink PDCP SN transmission status.

Step 9: After receiving the RRCConnectionReconfiguration message, the UE attempts to access the target cell using the RACH process. If the dedicated RACH preamble is allocated, the RACH proceeds on a non-competition basis, and otherwise, on a contention-based basis.

Step 10: The network performs uplink allocation and timing adjustment.

Step 11: When the UE has successfully connected to the target cell, the UE transmits an RRCConnectionReconfigurationComplete message (CRNTI) to confirm handover and informs the target BS of the completion of the handover process by transmitting an uplink buffer status report. The target BS checks the C-RNTI received through the Handover Confirm message and starts data transmission to the UE.

Step 12: The target base station sends a Path Switch message to the MME to inform the UE that it has changed the cell.

Step 13: The MME sends a User Plane Update Request message to the serving gateway.

Step 14: The serving gateway switches the downlink data path to the target side. The serving gateway sends an end marker packet to the source base station over the existing path, and then releases the user plane/TNL resource for the source base station.

Step 15: The serving gateway sends a User Plane Update Response message to the MME.

Step 16: The MME responds to the path switch message using the path switch Ack message.

Step 17: The target base station transmits a UE Context Release message to inform the source base station that the HO is successful and triggers the resource release.

Step 18: Upon receiving the UE context release message, the source base station releases the user plane related resources associated with the radio resource and the UE context.

Random Access Procedure (RACH Procedure)

Figure 9:
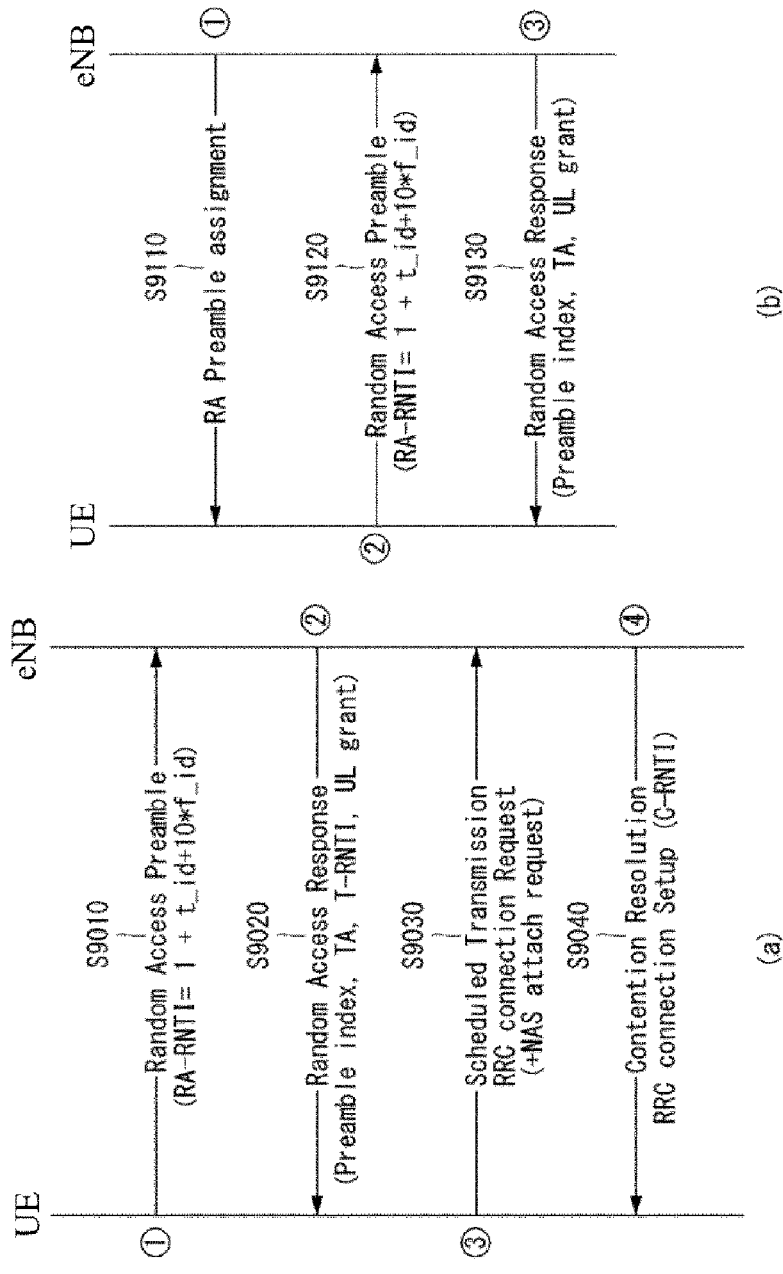
FIG. 9 is a diagram for describing an operation procedure of a UE and an eNB in contention-based Random-Access procedure.

FIG. 9 illustrates one example of a random access procedure in an LTE system.

The random access procedure is performed at the initial access in the RRC IDLE, the initial access after the radio link failure, handover requesting the random access procedure, and the uplink or downlink data generation requiring the random access procedure during the RRC_CONNECTED. Some RRC messages including an RRC connection request message, a cell update message, an UTRAN registration area (URA) update message, and the like are also transmitted by using the random access procedure. A logical channel common control channel (CCCH), a dedicated control channel (DCCH), and a dedicated traffic channel (DTCH) may be mapped to a transport channel RACH. The transport channel RACH is mapped to a physical random access channel (PRACH).

When the MAC layer of the UE instructs a UE physical layer to transmit the PRACH, the UE physical layer first selects one access slot and one signature and transmits A PRACH preamble to the uplink. The random access procedure is divided into a contention-based random access procedure and a non-contention based random access procedure.

FIG. 9(a) above illustrates an example of a contention based random access procedure and FIG. 9(b) above illustrates an example of a non-contention based random access procedure.

First, the contention-based random access procedure will be described with reference to FIG. 9(a) above.

The UE receives and stores information on the random access from the BS through the system information. Thereafter, when the random access is required, the UE transmits a random access preamble (also referred to as message 1) to the BS (S9010).

When the BS receives the random access preamble from the UE, the BS transmits a random access response message (also referred to as message 2) to the UE (S9020). Specifically, downlink scheduling information for the random access response message may be CRC-masked with a random access-radio network temporary identifier (RA-RNTI) and transmitted on an L1 or L2 control channel (PDCCH). The UE receiving the downlink scheduling signal masked with the RA-RNTI may receive and decode the random access response message from a physical downlink shared channel (PDSCH). Thereafter, the UE checks whether the random access response information indicated to the UE exists in the random access response message.

Whether there is the random access response information indicated to the UE may be confirmed by whether there is a random access preamble ID (RAID) for the preamble transmitted by the UE.

The random access response information includes timing alignment (TA) indicating timing offset information for synchronization, radio resource allocation information used in the uplink, temporary ID (e.g., temporary C-RNTI) for terminal identification, and the like.

When receiving the random access response information, the UE performs uplink transmission (also referred to as message 3) on the uplink shared channel (S-SCH) according to the radio resource allocation information included in the response information (S 9030). Here, the uplink transmission may be expressed as scheduled transmission.

After receiving the uplink transmission from the UE, the BS transmits a message (also referred to as message 4) for contention resolution to the UE through a downlink shared channel (DL-SCH).

First, the non-contention based random access procedure will be described with reference to FIG. 9(b) above.

Before the UE transmits the random access preamble, the BS allocates a non-contention random access preamble to the UE (S9110).

The non-contention random access preamble may be allocated through a handover command or dedicated signaling such as the PDCCH. When the UE is allocated the non-contention random access preamble, the UE transmits the non-contention random access preamble allocated to the BS (S9120).

Thereafter, the BS may transmit the random access response (also referred to as message 2) to the UE similar to step S2002 in the contention based random access procedure (S9130).

In the random access procedure described above, the HARQ is not applied to the random access response, but the HARQ may be applied to a message for uplink transmission or contention resolution for the random access response. Therefore, the UE does not need to transmit the ACK or NACK for the random access response.

Next, a UL data transmission method in LTE (-A) or 802.16 will be described in brief.

A cellular system such as an LTE(-A) system or an 802.16m system uses a BS scheduling-based resource allocation scheme.

A UE having data (i.e., UL data) to be transmitted in a system using the BS scheduling-based resource allocation scheme requests to the BS a resource for the corresponding data transmission before transmitting data.

Such a scheduling request by the UE may be performed through scheduling request (SR) transmission to the PUCCH or buffer status report (BSR) transmission to the PUSCH.

In addition, when resources to transmit the SR or BSR are not allocated to the UE, the UE may request the uplink resource to the BS through an RACH procedure.

The BS that receives the scheduling request from the UE allocates the uplink resource to be used by the corresponding UE to the UE through a downlink control channel (i.e., an UL grant message and a DCI for LTE(-A)).

In this case, the UL grant transmitted to the UE may be notified by explicitly signaling to which subframe resource the resource allocated to the UE corresponds, but the resource is allocated to a subframe after a specific time (e.g., 4 ms in the case of the LTE) to define an appointed time between the UE and the BS.

As described above, allocating, by the BS, the resources after Xms (e.g., 4 ms in the case of the LTE(-A)) to the UE means allocating, by the UE, the resources of the UE by considering both a time of receiving and decoding the UL grant and a time of preparing and encoding the data to be transmitted.

Figure 10:
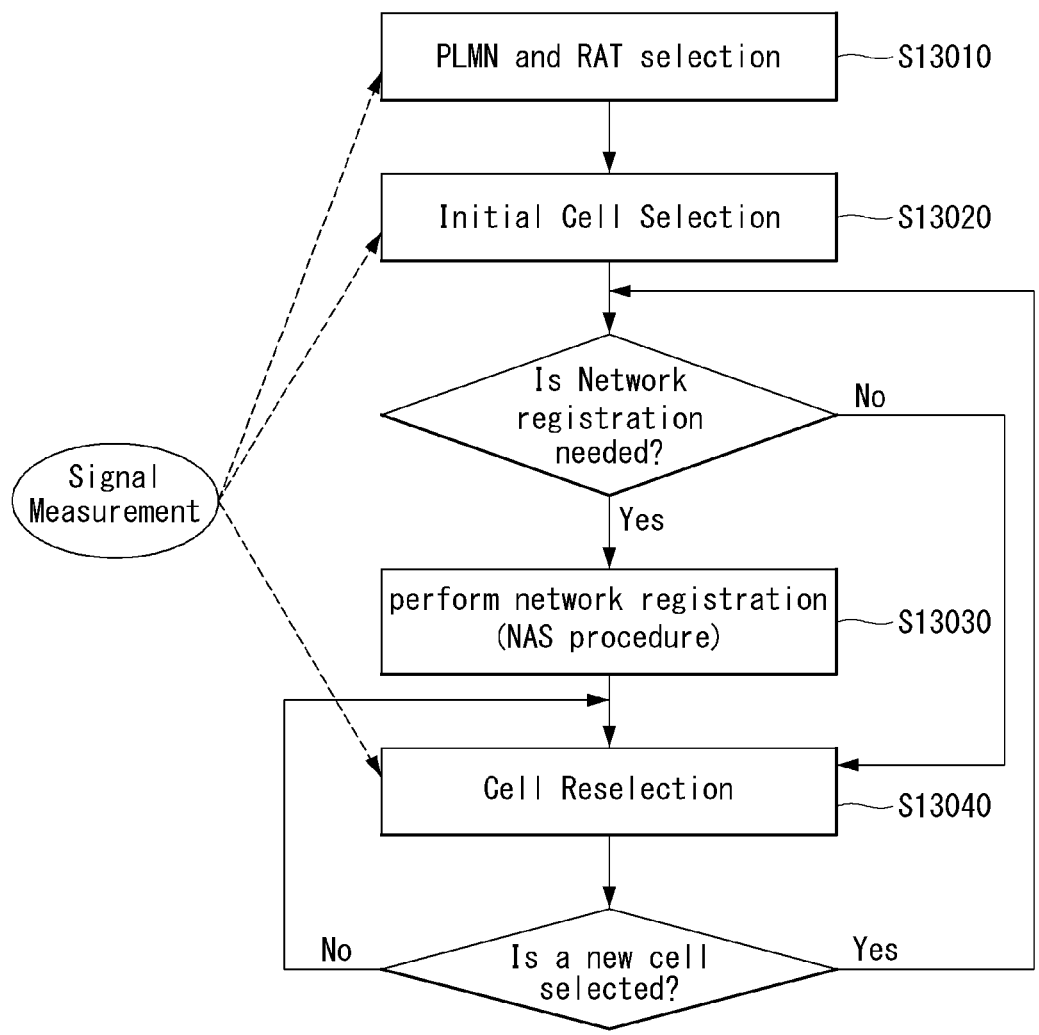
FIG. 10 is a flowchart showing an operation of a UE in an RRC idle state to which the present invention may apply.

FIG. 10 is a flowchart showing an operation of a UE in an RRC idle state to which the present invention may apply.

FIG. 10 shows a procedure in which a UE is registered to a network through a cell selection process when the UE is initially powered on and a cell reselection is performed when necessary.

Referring to FIG. 10, the UE selects a Radio Access Technology (hereinafter, referred to as "RAT") for communicating with a Public Land Mobile Network (hereinafter, referred to as "PLMN") from which the UE itself desires to receive a service (S10010). The information about PLMN and RAT may be selected by the user of the UE, and what is stored in the USIM (universal subscriber identity module) may be also used.

The UE selects a cell having the largest value among the cells that the measured base station has a value greater than a particular value in the signal intensity and quality (cell selection) (S10020). Then, it receives SI being sent by the base station. The particular value denotes a value defined by a system to guarantee the quality of physical signals in the data transmission and/or reception. Accordingly, the value may vary based on the RAT to be applied.

The UE registers its own information (for example, IMSI) for receiving a service (for example, paging) from a network (S10030). Here, the UE is not registered into a network to be accessed whenever selecting a cell but registered into a network in case when network information received from SI (for example, Tracking Area Identity (TAI)) is different from network information that the UE itself knows.

The UE performs cell re-selection based on a service environment provided in a cell, a UE environment, or the like (S10040). If a value of the signal intensity and quality measured by the base station from which the UE receives a service is less than a value measured by the base station of the neighboring cell, then the UE selects one of the other cells providing signals having better characteristics than those of the cell of the base station being accessed by the UE. This process is called a cell reselection to distinguish it from an initial cell selection in the second step. At this time, a time restriction condition may be specified in order to prevent a cell from being frequently reselected based on the change of the signal characteristics.

Figure 11:
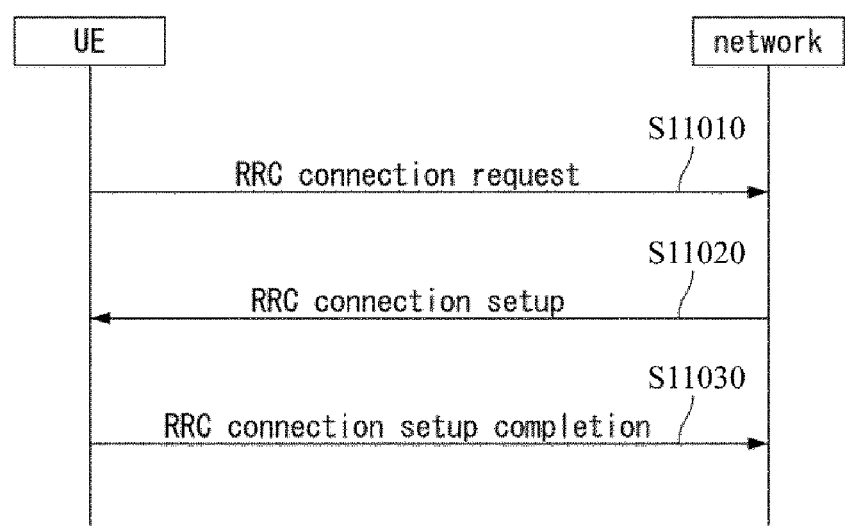
FIG. 11 is a flowchart showing an RRC connection establishment procedure to which the present invention may apply.
Figure 12:
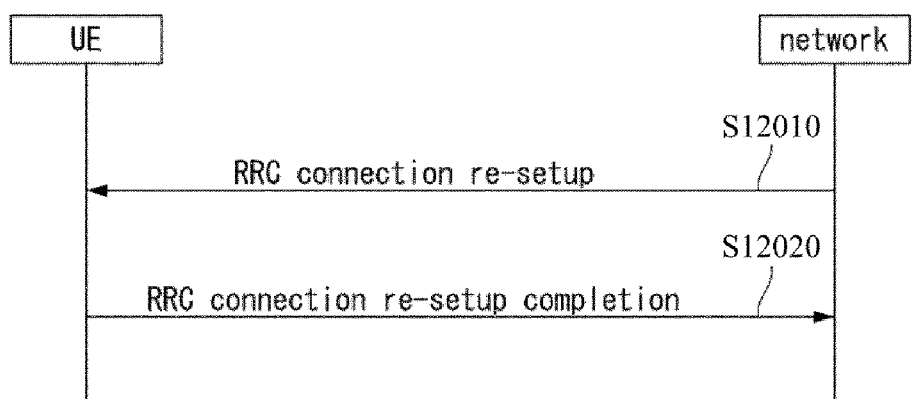
FIG. 12 is a flowchart showing an RRC connection reconfiguration procedure to which the present invention may apply.

FIG. 11 is a flowchart showing an RRC connection establishment procedure to which the present invention may apply.

A UE sends to a network an RRC connection request message for requesting an RRC connection (S11010). The network sends an RRC connection setup message in response to the RRC connection request (S11020). After receiving the RRC connection setup message, the UE enters an RRC connection mode.

The UE sends to the network an RRC connection setup complete message used to confirm successful completion of the RRC connection establishment (S11030).

Figure 15A:
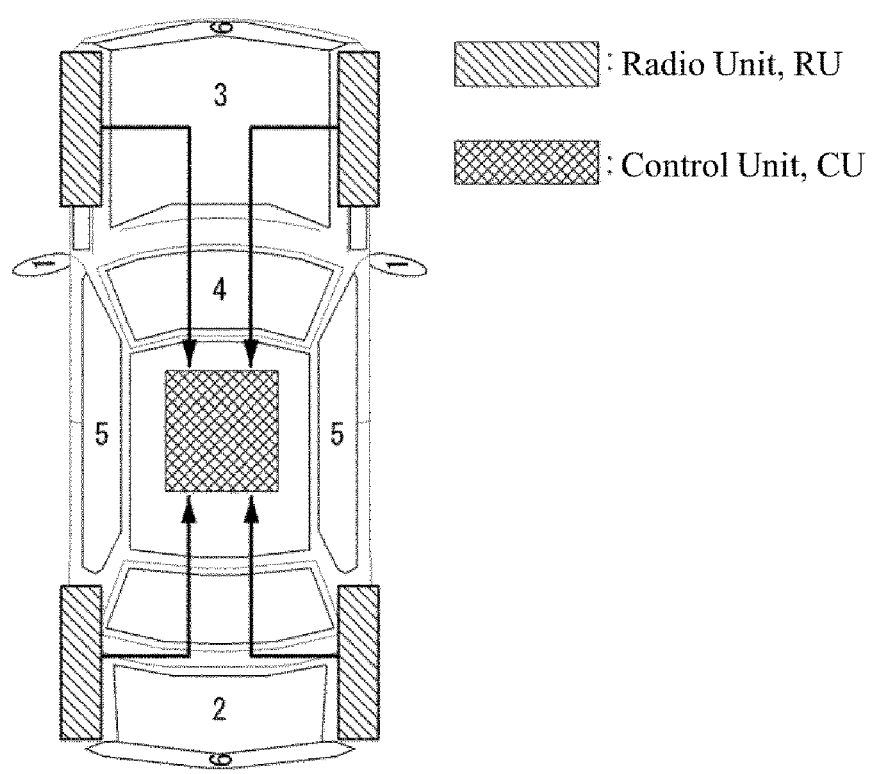
FIGS. 15a and 15b are diagrams illustrating an example of a UE including a multiple antenna to which the present invention may be applied.
Figure 15B:
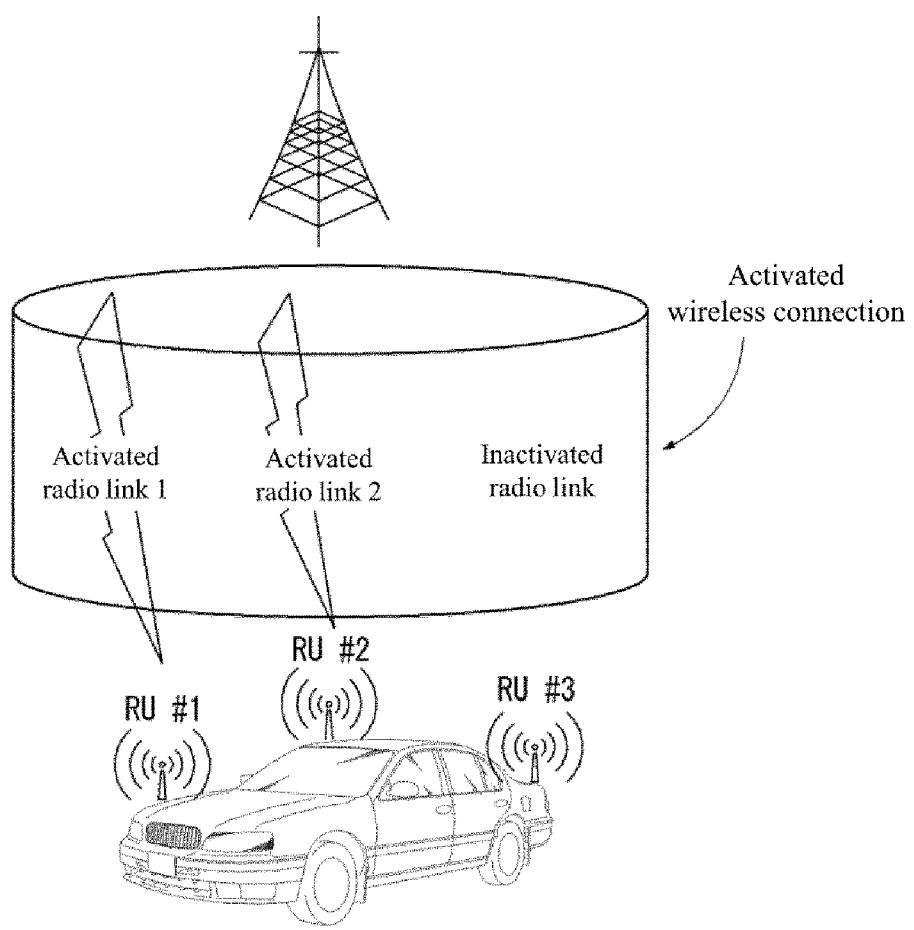

FIG. 15a and 15b are flowcharts showing an RRC connection reconfiguration procedure to which the present invention may apply.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S15010). In response to the RRC connection reconfiguration, the UE sends to the network an RRC connection reconfiguration complete message used to confirm successful completion of the RRC connection reconfiguration (S15020).

The following is a detailed description of a procedure of selecting a cell by a UE.

When power is turned-on or the UE is located in a cell, the UE performs procedures for receiving a service by selecting/reselecting a suitable quality cell.

A UE in an RRC idle state should prepare to receive a service through the cell by always selecting a cell of a proper quality. For example, a UE where power is turned-on just before should select a cell of a proper quality to registered in a network. If the UE in an RRC connection state enters in an RRC idle state, the UE should select a cell for stay in the RRC idle state. In this way, a procedure of selecting a cell satisfying a certain condition by the UE in order to be in a service idle state such as the RRC idle state refers to cell selection. Since the cell selection is performed when a cell in the RRC idle state has not been selected, it is important to select the cell as soon as possible.

Accordingly, as long as the cell provides more than a certain level of radio signal quality, the cell may be selected during a cell selection procedure of the UE, even if the cell does not provide the best radio signal quality.

A method and procedure of selecting a cell by a UE in a 3GPP LTE is described with reference to 3GPP TS 36.304 V8.5.0 (2009-03) "User Equipment (UE) procedures in idle mode (Release 8)".

A cell selection is largely divided into two processes.

The first process is an initial cell selection process. In this process, UE does not have preliminary information about a wireless channel. Accordingly, the UE searches all wireless channels to find a suitable cell. The UE searches for the strongest cell in each channel. Thereafter, once the UE finds a suitable cell that satisfies cell selection criteria, the UE selects the corresponding cell.

Next, the UE may select the cell using stored information or using information broadcasted by the cell. Accordingly, cell selection may be quickly done compared to an initial cell selection process. As long as the UE finds a cell that satisfies the cell selection criterion, the UE selects the corresponding cell. If any suitable cell that satisfies the cell selection criterion is not found though such a process, the UE performs an initial cell selection process.

After the UE selects a certain cell through a cell selection process, the signal strength and quality between the UE and the base station may be changed due to the change of the UE mobility and wireless environment. Therefore, if the quality of the selected cell is deteriorated, the UE may select another cell providing better quality. If a cell is reselected in this manner, this cell, in general, should be a cell that provides better signal quality than the currently selected cell.

This process is called a cell reselection. In terms of radio signal quality, in general, a basic purpose of the cell reselection process is to select a cell providing best quality to the UE.

Apart from radio signal quality, the network may determine the priority for each frequency and notify the UE about this. Upon receiving the priority, the UE may take this priority into consideration more than the radio signal quality criterion during the cell reselection process.

As described above, there is a method of selecting or reselecting a cell based on the signal property of the wireless environment. When a cell is selected for reselection in the cell reselection process, the following cell reselection methods may be used, based on the RAT and frequency characteristics of the cell.

Intra-frequency cell reselection: A reselected cell is a cell having the same RAT and same center-frequency as a cell on which the UE is currently camping.

Inter-frequency cell reselection: A reselected cell is a cell having the same RAT as a cell on which the UE is currently camping but has a different center-frequency than it.

Inter-RAT cell reselection: A reselected cell is a cell using a RAT different from the RAT of a cell on which the UE is currently camping.

The principles of the cell reselection process are as follows.

First, the UE measures the qualities of a serving cell and a neighboring cell for the cell reselection.

Second, the reselection is performed based on the cell reselection criterion. The cell reselection criterion has the following features in relation to the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called the best ranked cell. The cell index value is basically a value obtained by the UE measures on the corresponding cell, to which a frequency offset or cell offset is used as necessary.

The inter-frequency cell reselection is based on a frequency priority provided by the network. The UE attempts to camp on a frequency having the highest frequency priority. The network may provide the frequency priority common for in-cell UEs through broadcast signaling or provide a frequency-specific priority for each UE through UE-dedicated signaling. The cell reselection priority provided through broadcast signaling may be called a common priority, and the cell reselection priority set for each UE by the network may be called a dedicated priority. If the UE receives the dedicated priority, the UE may receive the relevant validity time along with the dedicated priority. Upon receiving the dedicated priority, the UE starts the validity timer which is set to the received validity time. The UE applies the dedicated priority in the RRC idle mode while the validity timer is operating. When the validity timer expires, the UE discards the dedicated priority and applies the common priority again.

For the inter-frequency cell reselection, the network may provide the UE with a parameter (e.g., a frequency-specific offset) used in cell reselection for each frequency.

For the intra-frequency cell reselection or the inter-frequency cell reselection, the network may provide the UE with a Neighboring Cell List (NCL) used in cell reselection. The NCL includes a cell-specific parameter (e.g., a cell-specific offset) used in cell reselection.

For the intra-frequency or inter-frequency cell reselection, the network may provide the UE with a cell reselection black list used in cell reselection. The UE does not perform cell reselection on a cell included in the black list.

Hereinafter, RLM (Radio Link Monitoring) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level that does not allow for stable reception via a downlink radio link, and this corresponds to a 10% block error rate of hypothetical PDCCH transmission considering PDFICH errors. The threshold Qin is defined as a downlink radio link quality level that allows for more stable reception than the threshold Qout, and this corresponds to a 2% block error rate of hypothetical PDCCH transmission, with PCFICH errors taken into account.

Hereinafter, a radio link failure (RLF) is described.

A UE continues to perform measurement in order to maintain the quality of a radio link with a serving cell receiving a service. The UE determines whether or not communication is impossible under the current circumstance due to a deterioration of the quality of the radio link with the serving cell.

If the quality of the serving cell is too low and thus communication is nearly impossible, the UE determines the current circumstance as a radio link failure.

If a radio link failure is determined, the UE abandons maintaining communication with the current serving cell, selects a new cell through a cell selection (or cell reselection) procedure, and attempts an RRC connection re-establishment to the new cell.

The UE, if the following problems occur on the radio link, may determine that RLF has occurred.

(1) First, it May be Determined that RLF has Occurred Due to a Physical Channel Problem.

If the quality of RS (reference signal) periodically received from an eNB over a physical channel is detected as equal to or smaller than a threshold, the UE may determine that an out-of-sync condition has occurred in the physical channel. If the out-of-sync condition occurs consecutively a specific number of times (e.g., N310), an RRC is notified about this. Having received an out-of-sync message from a physical layer, the RRC runs a timer T310, and waits for the problem with the physical channel to be solved while the timer T310 is running. If the RRC receives a message indicating that an in-sync condition has occurred consecutively a specific number of times (e.g., N311), from the physical layer while the timer T310 is running, the RRC determines that the physical channel problem has been solved and then stops the running timer T310. On the contrary, if the RRC receives no in-sync message until the timer T310 expires, the RRC determines that an RLF has occurred.

(2) It May be Determined that an RLF has Occurred Due to a MAC Random Access Problem.

The UE, while performing the random access procedure at the MAC layer, goes through random access resource selection->random access preamble transmission->random access response reception->contention resolution. The above overall process is referred to as one random access procedure, and unless this procedure is successfully done, the next random access procedure is carried out after waiting a backoff time. If such a random access procedure is unsuccessful despite a predetermined number (e.g., preambleTransMax) of attempts, the RRC is informed about this, and the RRC then determines that an RLF has occurred.

(3) it May be Determined that an RLF has Occurred Due to an RLC Maximum Retransmission Problem.

If AM (Acknowledged Mode) RLC is used at the RLC layer, the UE retransmits an RLC PDU that was not successfully transmitted.

However, if a predetermined number of (e.g., maxRetxThreshold) of attempts to retransmit a specific AMD PDU do not succeed in the AM RLC, the RRC is informed about this and the RRC then determines that an RLF has occurred.

The RRC determines that an RLF occurs due to the above three reasons. If an RLF occurs thusly, an RRC connection re-establishment is performed to re-establish an RRC connection with the eNB.

The RRC connection re-establishment procedure is performed as follows when an RLF occurs.

If the UE determines that a serious problem with an RRC connection has occurred, it performs an RRC connection re-establishment procedure in order to re-establish a connection with the eNB. The serious problem with the RRC connection may include the following five problems: (1) radio link failure (RLF); (2) handover failure; (3) mobility from E-UTRA; (4) PDCP integrity check failure; and (5) RRC connection reconfiguration failure.

If one of the above problems occurs, the UE runs the timer T311 and initiates an RRC connection re-establishment procedure. During this procedure, the UE goes through a cell selection random access procedure to connect to a new cell.

If a suitable cell is found through a cell selection procedure while the timer T311 is running, the UE stops the timer T311 and starts a random access procedure to the corresponding cell. However, if the UE cannot find a suitable cell until the timer T311 expires, the UE regards it an RRC connection failure and transitions to RRC IDLE mode.

Hereinafter, the RRC connection re-establishment procedure will be described in more detail.

Figure 13:
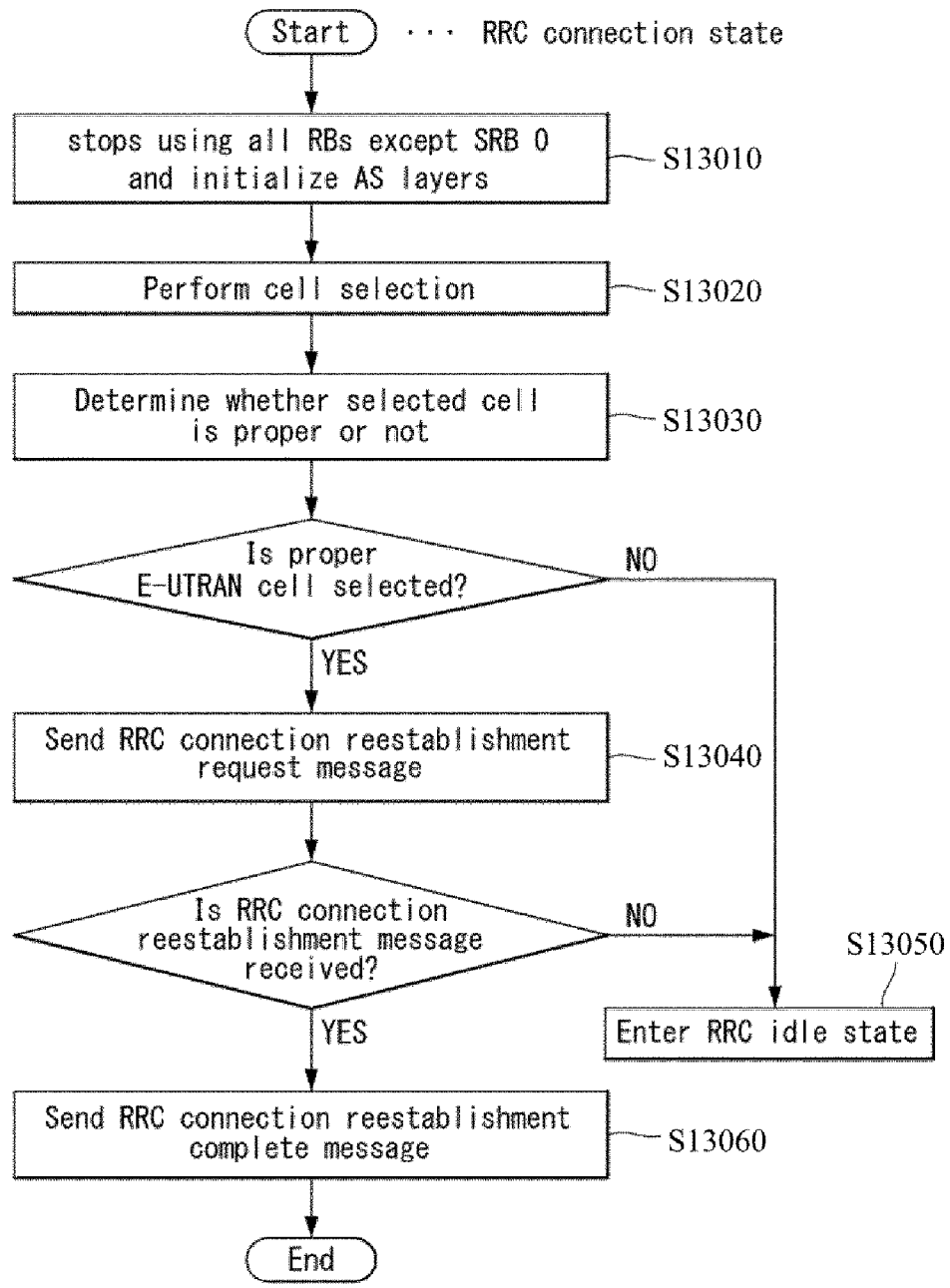
FIG. 13 is a view showing an example of an RRC connection re-establishment procedure to which the present invention may apply.

FIG. 13 is a view showing an example of an RRC connection re-establishment procedure to which the present invention may apply.

Referring to FIG. 13, the UE stops using all configured radio bearers except SRB 0 (Signaling Radio Bearer #0) and initializes various sub-layers of AS (Access Stratum) (S13010). Further, the UE sets up each sub-layer and physical layer as default configuration. During such procedure, the UE maintains the RRC connection state.

The UE performs a cell selection procedure for conducting an RRC connection reestablishment procedure (S13020). Although the UE maintains the RRC connection state during the RRC connection reestablishment procedure, the cell selection procedure may be performed in the same way as the cell selection procedure performed by the UE in the RRC idle mode.

After performing the cell selection procedure, the UE identifies the system information on a corresponding cell to determine whether the corresponding cell is a proper cell (S13030). If the selected cell is determined to be a proper E-UTRAN cell, the UE sends an RRC connection reestablishment request message to the corresponding cell (S13040).

On the other hand, if the cell selected through the cell selection procedure for performing the RRC connection reestablishment procedure is determined to be a cell using an RAT other than the E-UTRAN, the UE stops the RRC connection reestablishment procedure and enters the RRC idle state (S13050).

The UE may be implemented to complete checking whether the cell is proper within a limited time through the cell selection procedure and reception of the system information on the selected cell. To this end, the UE may run a timer as the UE initiates the RRC connection reestablishment procedure. If it is determined that the UE has selected a proper cell, the timer may be stopped. When the timer expires, the UE considers it a failure of the RRC connection reestablishment procedure and may enter the RRC idle mode. This timer is hereinafter referred to as a radio link failure timer. According to the LTE spec. TS 36.331, a timer named T311 may be used as the radio link failure timer. The UE may obtain set values for the timer from the system information of the serving cell.

Upon receiving the RRC connection reestablishment request message from the UE and accepting the request, the cell transmits an RRC connection reestablishment message to the UE.

Upon receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure is complete (S13060).

On the contrary, unless the cell receives the RRC connection reestablishment request message from the UE and accepts the request, the cell transmits an RRC connection reestablishment reject message to the UE.

Once the RRC connection reestablishment procedure is successfully done, the cell and the UE perform an RRC connection reestablishment procedure. By doing so, the UE restores to the state as it was before performing the RRC connection reestablishment procedure and guarantees maximum service continuity.

Next, RLF reporting is now described.

The UE, if an RLF or handover failure occurs, reports such a failure event to the network in order to support MRO (Mobility Robustness Optimisation) of the network.

After the RRC connection reestablishment, the UE may provide an RLF report to the eNB. The radio measurements contained in the RLF Report may be used to identify coverage issues as the potential cause of the failure. This information may be used to exclude those events from the MRO evaluation of intra-LTE mobility connection failures and redirect them as input to other algorithms.

In case the RRC re-establishment fails or the UE does not perform any RRC re-establishment, the UE may make the RLF Report available to the eNB after reconnecting from idle mode. For this purpose, The UE stores the latest RLF or handover failure related information, and indicates RLF report availability at each subsequent LTE RRC connection (re-) establishment and handover to an LTE cell until the RLF report is fetched by the network or for 48 hours after the RLF or handover failure is detected.

The UE keeps the information during state transitions and RAT changes, and indicates RLF report availability again after it returns to the LTE RAT.

Availability of the RLF Report at the RRC connection setup procedure is the indication that the UE suffered from a connection failure and that the RLF Report from this failure was not yet delivered to the network. The RLF Report from the UE includes the following information:

The E-CGI of the last cell that served the UE (in case of RLF) or the target of the handover (in case of handover failure). If the E-CGI is not known, the PCI and frequency information are used instead.

E-CGI of the cell that the re-establishment attempt was made at.

E-CGI of the cell that served the UE at the last handover initialization, i.e. when message 7 (RRC Connection Reconfiguration) was received by the UE.

Time elapsed since the last handover initialization until connection failure.

An indication whether the connection failure was due to RLF or handover failure.

The radio measurements.

Location of failure

The eNB receiving the RLF Report from the UE may forward the report to the eNB that served the UE before the reported connection failure. The radio measurements contained in the RLF Report may be used to identify coverage issues as the potential cause of the failure. This information may be used to exclude those events from the MRO evaluation of intra-LTE mobility connection failures and redirect them as input to other algorithms.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like. Measurement for such a purpose is generally called radio resource management (RRM) measurement.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identity (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band.

Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement.

The UE performs the intra-frequency measurement and reports a measurement result to the network at a proper time, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement.

The UE has to be able to perform the inter-frequency measurement and report a measurement result to the network at an appropriate time.

When the UE supports measurement on a heterogeneous network based on different RATs, measurement on a cell of the heterogeneous network may be performed according to a configuration of a base station. Such a measurement is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 14:
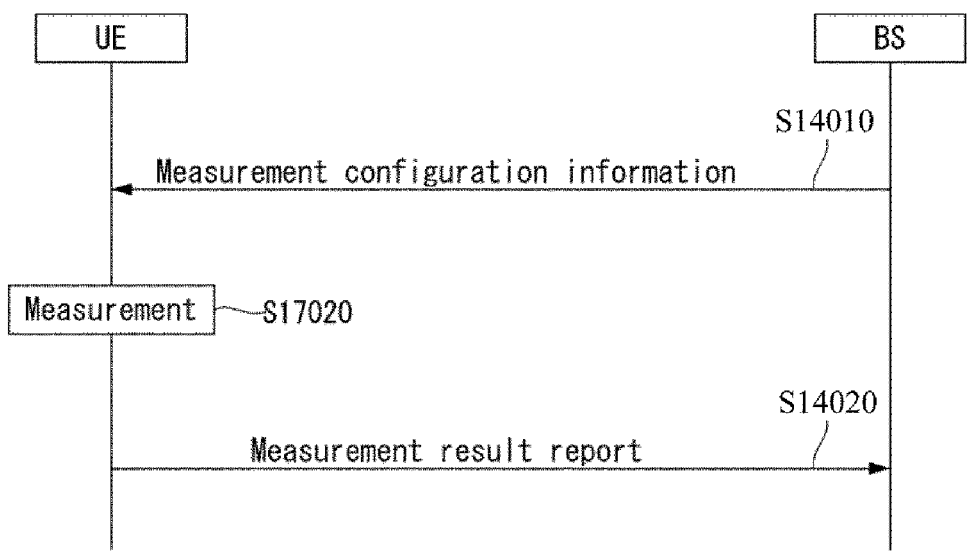
FIG. 14 is diagram showing an example of a measurement execution method and a setting of a measurement gap to which the present invention may apply.

FIG. 14 is diagrams showing an example of a measurement execution method which the present invention can be applied.

A UE receives measurement configuration information from a base station (S14010). A message including the measurement configuration information is referred to as a measurement configuration message. The UE performs measurement based on the measurement configuration information (S14020). If a measurement result satisfies a reporting condition included in the measurement configuration information, the UE reports the measurement result to the base station (S14030). A message including the measurement result is referred to as a measurement report message.

The measurement configuration information may include the following information.

(1) Measurement object information: The is information about an object on which the UE will perform measurement. The measurement object includes at least one of an intra-frequency measurement object which is an object of measurement within a cell, an inter-frequency measurement object which is an object of measurement between cells, and an inter-RAT measurement object which is an object of inter-RAT measurement. For example, the intra-frequency measurement object may indicate a neighboring cell having the same frequency band as a serving cell, the inter-frequency measurement object may indicate a neighboring cell having a different frequency band from that of the serving cell, and the inter-RAT measurement object may indicate a neighboring cell with a different RAT from that of the serving cell.

(2) Reporting configuration information: This is information about a report condition regarding the time when UE reports a measurement result and a report type. The report configuration information may consist of a list of report configurations. Each report configuration may include a reporting criterion and a reporting format. The report criterion is a criterion that triggers the transmission of a measurement result by UE. The reporting criterion may be the cycle of a measurement report or a single event for a measurement report. The reporting format is information about that UE will configure a measurement result using what type.

(3) Measurement identity information: this is information about a measurement identity that associates a measurement object with a reporting configuration so that UE determines to report what measurement object when and in what type. The measurement identity information may be included in a measurement report message and may be indicative that a measured result is about what measurement object and that a measurement report has occurred due to what report condition.

(4) Quantity configuration information: this is information about a parameter for setting the filtering of a measurement unit, a report unit and/or a measured result value.

(5) Measurement gap information: this is information about a measurement gap, that is, a section that may be used for UE to perform only measurement by not taking into consideration data transmission with a serving cell because downlink transmission or uplink transmission has not been scheduled. That is, in the measurement interval, no data is transmitted and received.

Table 1 below is a table showing an example of the pattern of the measurement interval.

TABLE 1

| Gap pattern ID | Measurement gap length (MGL, ms) | Measurement gap repetition period (MGL, ms) | inter frequency measurement for 480 ms and mimimum use time for RAT measurement | Object of measurement |
|---|---|---|---|---|
| 0 | 6 | 40 | 60 | Inter-Frequency E-UTRAN DFF and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

A UE has a measurement object list, a measurement reporting configuration list, and a measurement identity list, in order to perform the measurement procedure.

In 3GPP LTE, a base station may configure only one measurement object in UE with respect to a single frequency band. In accordance with Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table 3.

TABLE 2

| Event | Reporting Condition |
|---|---|
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

If the measurement result of the UE satisfies a set event, the UE sends a measurement report message to the base station.

Figure 16:
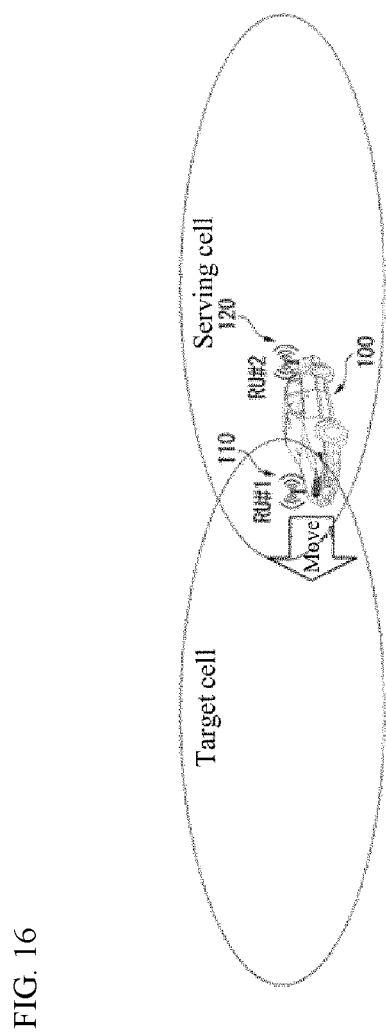
FIG. 16 is a diagram illustrating an example of a UE including a multiple antenna to perform a handover to which the present invention may be applied.

FIGS. 15a and 16 are diagrams illustrating an example of a UE including a multiple antenna to which the present invention may be applied.

The multiple antenna technology may be considered applied to a UE to support a high capacity service required for UEs in a next generation mobile communication system and a low latency high reliability service in which latency and reliability in data transmission becomes important.

That is, in order to obtain spatial multiplexing and diversity gain, a UE may include multiple distributed antennas.

Particularly, a large communication device of which spatial restriction is not so greater than the conventional personal mobile communication device may have more antennas.

FIG. 15a above shows an example of a UE in which multiple distributed antennas are installed. In the present invention, an antenna does not mean a physical antenna, but a logical concept of antenna.

That is, the antenna means an antenna that may perform an operation such as transmission and reception of a signal individually, and a plurality of physical antennas may construct a single logical antenna.

In addition, in the present invention, the antenna may communicate with external devices through a wireless communication, and called as a Radio Unit (RU), a transmission/reception reference point, a reception antenna group or an antenna connect.

As shown in FIG. 15a above, the UE may include multiple distributed antennas and a control unit (CU) having a control function.

The Radio Unit may include one or more layers (e.g., higher layer such as Radio Frequency (RF), PHY, MAC, etc.), and the category of each Radio Unit (hereinafter, may be called an RU) may be the same or different with each other.

In addition, the control unit may include the remaining layers except the layers included in the RU.

Table 3 below represents an example of the category of RU.

TABLE 3

| RU Category., | Maximum number of DL-SCH transport block bits received within a TTL., | Maximum number of bits of a DL-SCH transport block received within a TTL., | Total number of soft cannel bits. | Maximum number of supported layers for spatial multiplexing in DL. |
|---|---|---|---|---|
| Category 1., | 10296., | 10296., | 250368., | 1., |
| Category 2., | 51024., | 51024., | 1237248., | 2., |
| Category 3., | 102048., | 75376., | 1287248., | 2., |
| Category 4., | 150752., | 75376., | 1827072., | 2., |
| Category 5., | 290552., | 149776., | 3667200., | 4., |

TABLE 3-continued

| RU Category., | Maximum number of DL-SCH transport block bits received within a TTL., | Maximum number of bits of a DL-SCH transport block received within a TTL., | Total number of soft cannel bits. | Maximum number of supported layers for spatial multiplexing in DL. |
|---|---|---|---|---|
| Category 6., | 801504., | 149776 (4 layers), 75376 (2 layers)., | 3654144., | 2 or 4., |
| Category 7., | 301504., | 149778 (4 layers), 75376 (2 layers)., | 3654144., | 2 or 4., |
| Category 8., | 2998560., | 299856., | 35982720., | 8., |
| Category 9., | 452256., | 149776 (4 layers), 75376 (2 layers)., | 5481216., | 2 or 4., |
| Category 10., | 452256., | 149776 (4 layers), 75376 (2 layers)., | 5481216., | 2 or 4., |

The UE including a plurality of RUs may receive a message through a wireless connection with an eNB which is activated, and each of a plurality of RUs may transmit and receive a message with the eNB through an individual radio link of the wireless connection with the eNB which is activated.

For example, as shown in FIG. 15b, an activated wireless connection is existed between the UE and the serving eNB, and each of an RU 1, an RU 2 and an RU 3 included in the UE may transmit and receive a message individually through a wireless connection with the serving eNB which is activated.

Since the existing wireless communication system is designed considering a UE model of a single radio unit format, in the case that a new UE model of distributed multiple radio unit format is applied to the existing system without any change, although each of the RUs separated physically may measure different values for the same eNB/cell/frequency depending on a neighboring environment, i) it is determined whether to report with a single measurement value (e.g., a value measured by a specific RU, a highest value among the measurement values measured by the RUs included in the UE, and an average value of the measurement values measured by the RUs included in the UE) to the eNB, and ii) the radio links of all RUs are controlled in the same manner based on the single reported measurement value, and a performance degradation (e.g., handover, a radio link of a part of RUs is disconnected in the aspect of radio link failure or data reception failure) may occur.

For example, as shown in FIG. 16, in the case that the UE 100 including the RU 1 110 and the RU 2 120 moves from a serving cell to a target cell, a handover timing of the UE 100 may be changed as below depending on the RU that measures a measurement, a type of the measurement value, a reporting timing of the measurement value, and the like.
  Use the value measured by the RU 1 100: Handover is performed before RU 2 120 moves to the coverage for being provided with a service from the target cell, and a possibility is existed that a radio link is disconnected between RU 2 120 and the target cell.
  Use the value measured by the RU 2 100: Handover is not performed until the RU 1 100 gets out of the service provision coverage of the service cell, and a possibility is existed that a radio link is disconnected between RU 1 110 and the serving cell.
  Use the average value measured by the RU 1 110 and the RU 2 120: Performance degradation is distributed in each RU.

Accordingly, to solve the problem, it is proposed a method for establishing radio link/wireless connection through a separate control for each RU.

Particularly, all the RUs in the same UE that accesses a single eNB are managed integrally through a single wireless connection (e.g., RRC connection. However, a measurement value of each radio signal measured in each RU is reported to the eNB through the wireless connection.

If a condition that a specific situation (e.g., handover) occurs is satisfied, the radio link of one or more RUs may be controlled individually through the wireless connection.

For example, a specific eNB that manages all RUs in the UE may handover only a specific RU to another eNB. After the handover is completed, a plurality of wireless connections may be existed.

In this case, the remaining RUs except the specific RU is managed integrally through the wireless connection with the specific eNB, and the specific RU is managed by the another eNB through a wireless connection. That is, two primary cells are existed.

Hereinafter, an operation in the UE and the eNB is described in detail.

Figure 17:
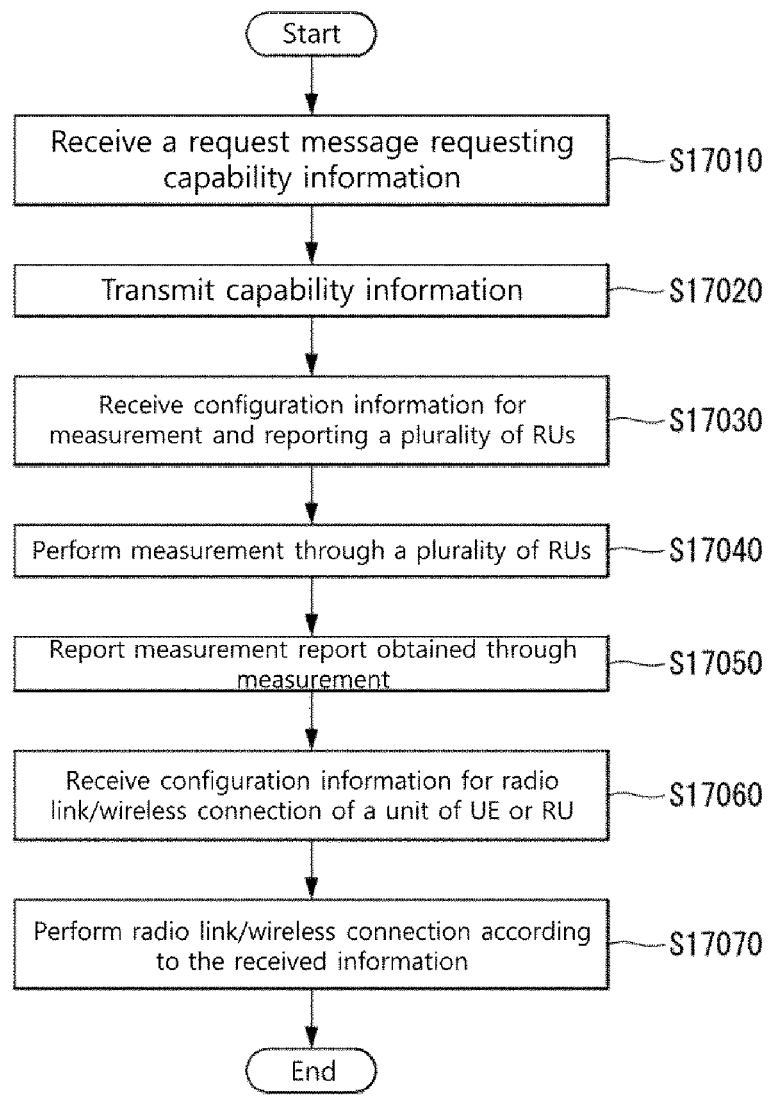
FIG. 17 is a flowchart illustrating an example of performing a connection of radio link through an individual measurement and reporting operation of a multiple antenna include in a UE to which the present invention may be applied.

FIG. 17 is a flowchart illustrating an example of performing a connection of radio link through an individual measurement and reporting operation of a multiple antenna include in a UE to which the present invention may be applied.

Referring to FIG. 17 above, a UE performs a measurement each of a plurality of distributed wireless antennas and reports each of the values to an eNB, and accordingly, each of radio links/wireless connection of a plurality of distributed wireless antennas is individually controlled.

Particularly, the UE including a plurality of RUs may receive a request message requesting capability information from the eNB (step, S17010).

The UE that receives the request message transmits its own capability information to the eNB (step, S17020).

The capability information may include rat-type of the UE, whether the UE includes a plurality of RUs, the number of the RUs and information related to each of the RUs.

The information related to each of the RUs may include an index of the RU, whether radio link/wireless connection of the RU is activated, a category, physical layer, an RF parameter, and the like.

The UE may transmit the capability information to the eNB even in the case that the UE does not receive the request message from the eNB.

The UE receives configuration information (first configuration information) for measurement and reporting of other RU as well as information of the RU in which radio link/wireless connection is activated from the eNB (step, S17030).

At this time, the configuration information may be received through at least one RU in which radio link/wireless connection is activated with eNB.

The configuration information may include different types of configuration information depending on the RU, and this may be distinguished according to the index of the RU.

In addition, each type of the configuration information according to the RU may include a condition for transmitting the measurement information to the eNB, a transmission period of the measurement information, an interval and whether the measurement information is transmitted together with the measurement information measured by other RU.

The UE that receives the configuration information performs a measurement in a unit of the RU according to the configuration information for each RU (step, S17040), and in the case that periodic or specific condition is satisfied according to the configuration information, transmits the measured measurement information to the eNB through a reporting message (step, S17050).

At this time, the measurement information measured by the RUs may be the same as or different from each other among the RUs and transmitted through at least one RU in which wireless connection/radio link with the eNB is activated.

If the RU transmits the measurement information of other RU of the same UE together to the eNB through the reporting message, it is not required to include fields having the same value (e.g., physical cell ID, measID, message type, etc.) in the reporting message repeatedly, and accordingly, efficiency of radio resource may be improved.

Table 4 below represents an example of a format of the reporting message.

TABLE 4

| eNB/cell #1 [{ rsrpResult measured in RU 1, rsrqResult measured in RU 1}, |
| --- |
| ...... |
| { rsrpResult measured in RU m, rsrqResult measured in RU m} ] |
| ...... |
| eNB/cell #n [{rsrpResult measured in RU 1, rsrqResult measured in RU 1}, |
| { rsrpResult measured in RU m, rsrqResult measured in RU m} ] |

The UE may receive configuration information (second configuration information) for radio link/wireless connection of a unit of UE or RU based on the measurement information included in the reporting message from the eNB (step, S17060), and perform radio link/wireless connection with another eNB according to the received information (step, S17070).

Through the step S17060, the UE may be indicated to move the radio link/wireless connection of a specific RU to another eNB from the eNB.

The procedure that the UE performs radio link/wireless connection with another eNB through the configuration information and the procedure that the UE activates radio link with the same eNB will be described below in detail.

Through the step S17010, the step S17030 and/or the step S17060, the UE may be indicated to activate radio link of a specific RU from the eNB and transmit and receive a control message and data with the eNB through the activated one or more RUs.

Through such a method, the UE including the multiple distributed antennas may perform a measurement through the respective individual antennas, and radio link/wireless connection may be controlled individually according to the measured measurement information.

Figure 18:
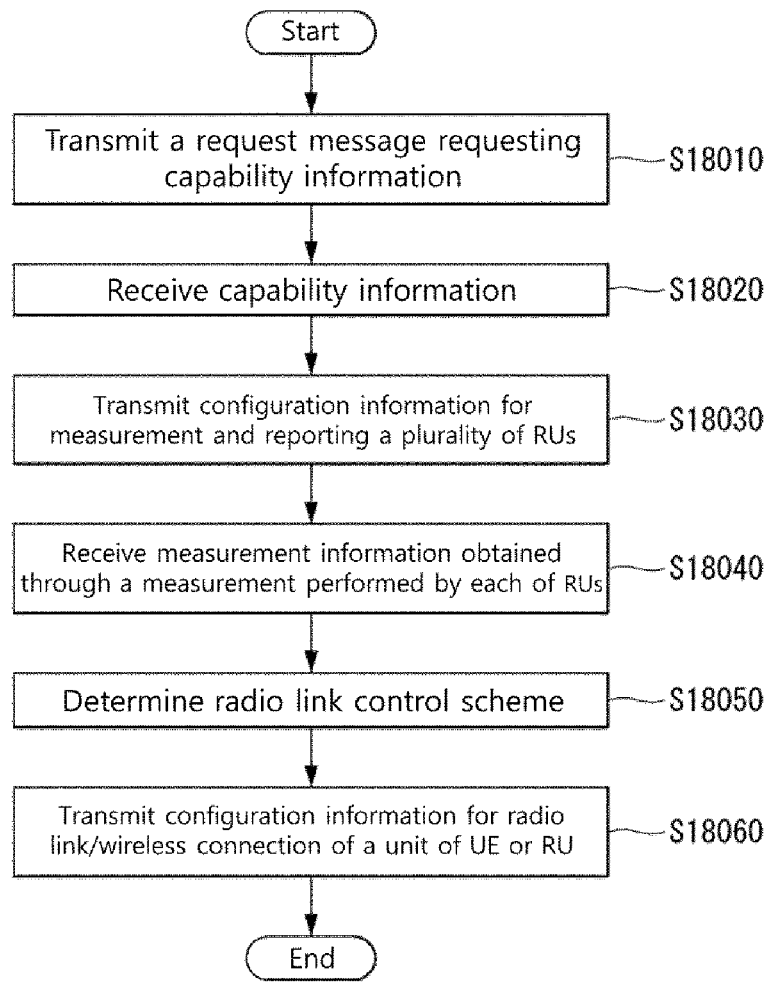
FIG. 18 is a flowchart illustrating an example of a method for controlling a connection of a radio link of a UE according to an individual measurement operation of a multiple antenna included in the UE to which the present invention may be applied.

FIG. 18 is a flowchart illustrating an example of a method for controlling a connection of a radio link of a UE according to an individual measurement operation of a multiple antenna included in the UE to which the present invention may be applied.

Referring to FIG. 18 above, an eNB may configure measurement and reporting operation of the UE including multiple distributed wireless antennas, and based on the reported measurement value, control radio link/wireless connection of each of multiple distributed the wireless antennas.

Particularly, the eNB does not identify that the UE includes multiple distributed antennas or a single antenna. Accordingly, the eNB transmits a request message that requests capability information to the UE to identify the capability of the UE (step, S18010).

The eNB that transmits the request message receives the capability information to the UE from the UE (step, S18020).

The capability information may include rat-type of the UE, whether the UE includes a plurality of RUs, the number of the RUs and information related to each of the RUs.

The information related to each of the RUs may include an index of the RU, whether radio link/wireless connection of the RU is activated, a category, physical layer, an RF parameter, and the like.

The eNB may receive the capability information from the UE even in the case that the eNB does not transmit the request message from the UE.

The eNB may know whether multiple RUs are included in the UE through the capability information, and based on the capability information, generate configuration information for measurement and reporting of each RU, and transmit the generated configuration information to the UE (step, S18030).

The configuration information may include a condition for transmitting measurement information measured by each of a plurality of RUs to the eNB, a transmission period of the measurement information and whether the measurement information is transmitted together with the measurement information measured by another RU.

At this time, each of the configurations included in the configuration information may be distinguished according to an index of the RU on a certain RU, and the eNB may set the measurement information to be reported on the same timing by configuring the reporting period, interval and count of the measurement information measured by each of a plurality of RUs.

In addition, through the step S18010 and/or the step S18030, the eNB may indicate to activate radio link of a specific RU to the UE and transmit and receive a control message and data with the UE through the activated one or more RUs.

Later, in the case that a periodic or specific event is generated from at least one RU among a plurality of the RUs (e.g., in the case that handover condition is satisfied), the eNB may receive a reporting message including the measurement information (step, S18040).

For example, the eNB may receive the reporting message through the RU in which a radio link is activated among a plurality of the RUs included in a single UE. At this time, a plurality of the RUs has an establishment of a wireless connection with the eNB.

The measurement information may be transmitted to the eNB through the RU that does not perform a measurement as well as the RU that performs a measurement. For example, the measurement information measured by RU 1 may be transmitted to the eNB through the reporting message by RU 2.

In addition, the reporting message is transmitted through at least one RU. That is, the reporting message may be transmitted to the eNB through each of a plurality of the RUs.

The eNB determines a radio link control scheme of the UE based on the measurement information measured by one or more RUs included in the RU which is include in the received reporting message (step, S18050).

That is, a channel situation may be changed depending on a position on which a plurality of the RUs is mounted, a neighboring situation of the UE (e.g., in the case that angle of reflection of a signal transmitted and received with each RU is changed by a neighboring building), and the like.

Accordingly, the eNB determines a control scheme based on the obtained measurement information.

For example, in the case that the signal strengths measured by a plurality of the RUs mounted on the UE are not different meaningfully, the eNB may control the radio links of a plurality of the RUs in the same manner (hereinafter, this is referred to as a control scheme in a unit of UE), and in the case that the signal strengths measured by a plurality of the RUs mounted on the UE are different meaningfully, the eNB may control the radio links of a plurality of the RUs individually (hereinafter, this is referred to a control in a unit of RU).

The control scheme in a unit of UE and the control in a unit of RU will be described below in detail.

The eNB transmits the configuration information (second configuration information) for radio link/wireless connection of a plurality of the RUs to the UE according to the determined control scheme (step, S18060).

Through such a method, the eNB may control radio link and wireless connection of multiple distributed antennas included in the UE individually or entirely.

Radio Link/Wireless Connection Control in a Unit of UE

Figure 19:
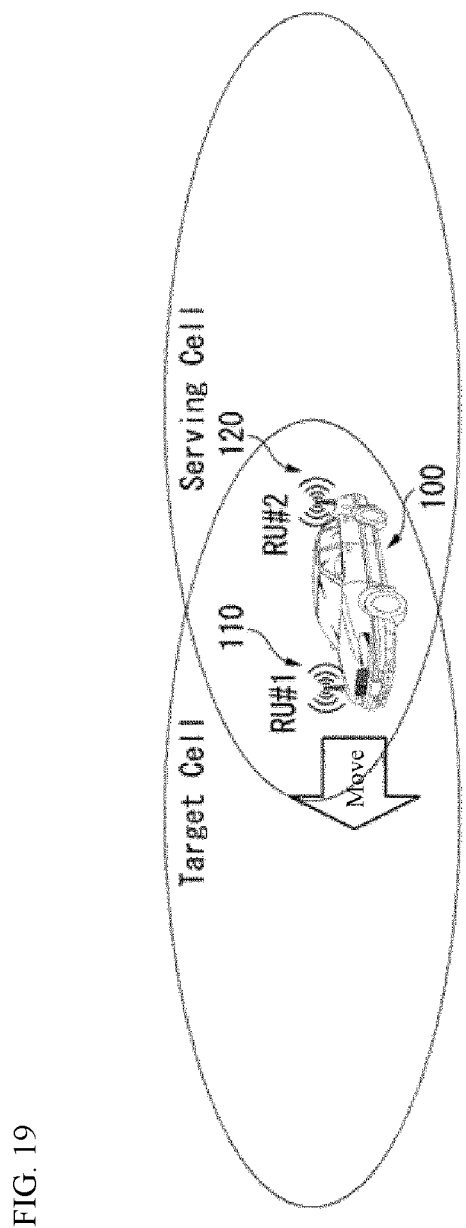
FIG. 19 is a diagram illustrating an example of a handover method of a UE including multiple antennas to which the present invention may be applied.

FIG. 19 is a diagram illustrating an example of a handover method of a UE including multiple antennas to which the present invention may be applied.

Referring to FIG. 19 above, in the case that all multiple distributed antennas mounted on a UE are included in coverage of the same cell, a serving eNB may control the multiple distributed antennas in a unit of UE.

Particularly, as shown in FIG. 19, in the case that a UE 100 on which an RU 1 110 and an RU 2 120 are mounted moves from a serving cell to a target cell, the serving eNB of the serving cell may control the RU 1 110 and the RU 2 120 to handover to a target eNB of the target cell based on the measurement information measured by the RU 1 110 and the RU 2 120, which is received from the UE.

In the case that the serving eNB determines to control radio link and wireless connection of the RU 1 110 and the RU 2 120 in a unit of UE, the eNB of the serving cell may configure radio link and wireless connection in a unit of UE to handover all the radio link of the RU 1 110 and the RU 2 120 to the target eNB of the target cell.

The serving eNB may transmit configuration information for radio link and wireless connection constructed with the information below to the UE 100.

At this time, the UE 100 may receive the configuration information through the RU in which radio link with the serving eNB is activated between the RU 1 110 and the RU 2 120.

Radio link control scheme
In the case that radio link with a part of RUs is released (released state), an index of RU to be switched to be connected (connected state).
In the case that radio link with a part of RUs is connected (connected state), an index of RU to be switched to be released (released state).
Information of the target eNB and information for a random access with the target eNB
Environmental information to be applied to each RU to which radio link and wireless connection are handed over to the target eNB (e.g., CSI-report configuration, etc.).

The RU 1 110 and the RU 2 120 that receive the configuration information may handover to the target eNB based on the configuration information.

Radio Link/Wireless Connection Control in a Unit of RU

Figure 20:
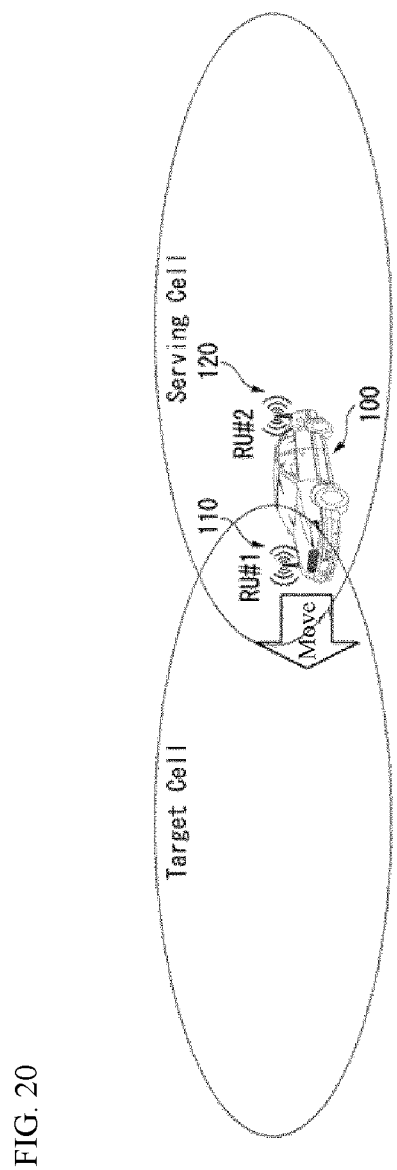
FIG. 20 is a diagram illustrating another example of a handover method of a UE including multiple antennas to which the present invention may be applied.

FIG. 20 is a diagram illustrating another example of a handover method of a UE including multiple antennas to which the present invention may be applied.

Referring to FIG. 20 above, in the case that multiple distributed antennas mounted on a UE are included in coverage of different cells with each other, a serving eNB may control the multiple distributed antennas in a unit of antenna.

Particularly, as shown in FIG. 20, in the case that a UE 100 on which an RU 1 110 and an RU 2 120 are mounted moves from a serving cell to a target cell, the RU 1 110 moves to the coverage of the target cell, but the RU 2 120 is still unable to move to the coverage of the target cell.

In the case that the serving eNB of the serving cell may control the RU 1 110 to handover to the target eNB first based on the measurement information measured by the RU 1 110 and the RU 2 120, which is received from the UE, and after the RU 2 120 moves to the coverage of the target cell, and then control the RU 2 120 handover to the target eNB.

For the control in a unit of the RU, the serving eNB transmits configuration information for radio link and wireless connection constructed with the information below to the UE 100.

Radio link control scheme
Index of the RU to perform handover
Whether to switch a connected (connected state) or a released (released state) of the RU which is controlled.
Information of the target eNB
Environmental information to be applied to each RU for radio link and wireless connection to the target eNB (e.g., CSI-report configuration, etc.).
Information on whether to perform a random-access procedure with the target eNB and the random access
Whether to start a transmission of a control message for wireless connection (e.g., RRC message) and a transmission starting time
Whether to start a transmission of higher layer control message (e.g., NAS message, etc.) and a transmission starting time
Whether to start a data transmission and reception and a transmission starting time
Information for a data transmission and reception (e.g., bearer ID, etc.)

Later, each of the RUs targeted to handover may perform handover to the target eNB based on the configuration information.

Figure 21:
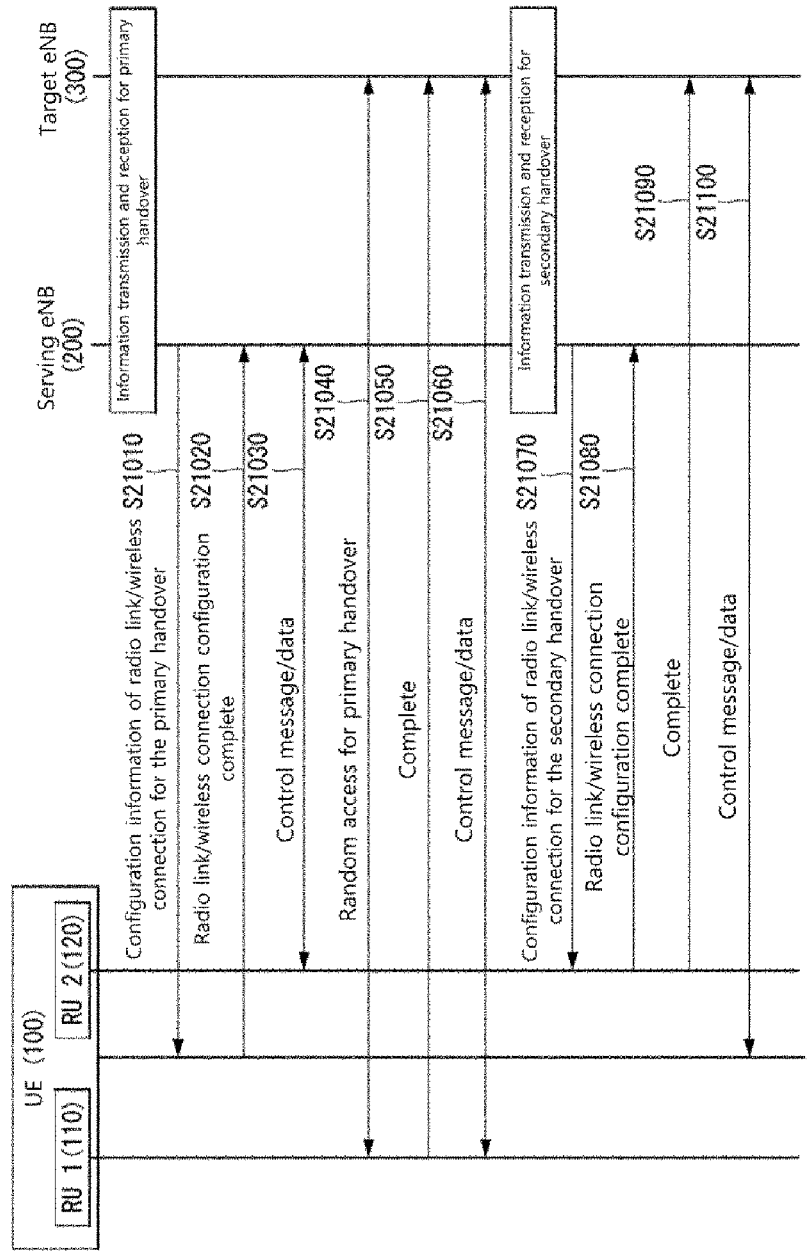
FIG. 21 is a flowchart illustrating an example of a method for a multiple antenna included in a UE to handover to the same target eNB to which the present invention may be applied.

FIG. 21 is a flowchart illustrating an example of a method for a multiple antenna included in a UE to handover to the same target eNB to which the present invention may be applied.

Referring to FIG. 21 above, in the case that multiple distributed antennas mounted on a UE are included in coverage of different cells with each other, a serving eNB may control each of the multiple distributed antennas individually in order not to occur radio link failure.

First, in FIG. 21, it is assumed that a UE 100 is mounted with an RU 1 110 and an RU 2 120 which are distributed antennas, and a primary cell of the RU 1 110 and the RU 2 120 are the same.

However, such an assumption is just for the convenience of description, but the present invention is not limited thereto.

Particularly, in the case that the UE 100 moves as shown in FIG. 20, a serving eNB 200 of a serving cell, which is the primary cell, may determine to control the UE in a unit of RU.

The serving eNB 200 that determines to handover to a target eNB 300 for the RU 1 110 exchanges information (e.g., context information of the UE, capability information, radio link control scheme, RU for performing handover, whether to start transmission of control message and data and transmission start timing, environmental configuration information, information for random access, etc.) for handover (primary handover) of the RU 1 110 with the target eNB.

Later, the serving eNB transmits the configuration information for the primary handover to the UE 100 (step, S21010).

At this time, since both of the RU 1 110 and the RU 2 120 are included in the coverage of the serving eNB, the serving eNB may transmit the configuration information to the UE through an activated radio link between the RU 1 110 and the RU 2 120.

Table 5 below represents an example of the configuration information for the primary handover.

TABLE 5

| Field | Value |
|---|---|
| Radio link control scheme | Unit of RU |
| RU index | RU #1 |
| Whether to switch radio link connection/release | NO |
| Target eNB/cell | XX |
| Environmental information to be applied in target eNB/cell (e.g., CSI-report configuration) | |
| Whether to perform random access to target eNB/cell | YES |
| Random access information | |
| Whether to start control message for wireless connection (e.g., RRC message) | YES |
| Timing of starting control message for wireless connection | Immediately after completing primary handover |
| Whether to start higher control message (e.g., NAS message) | YES |
| Timing of starting higher control message (e.g., NAS message) | Immediately after completing next handover |
| Whether to start data transmission and reception | YES |
| Timing of starting data transmission and reception | Immediately after completing primary handover |
| Information of data transmission and reception (e.g., Bearer ID) | |

The UE that receives the configuration information transmits a configuration complete message to the serving eNB 200 through the RU 1 110 and the RU 2 120 (step, S21020).

In the case of transmitting the configuration complete message, since the RU 1 110 performs a procedure for the primary handover with the target eNB, the serving eNB may transmit and receive a control message and data only with the RU 2 120 of the UE 100 (step, S21030).

Independently with the step S21030, the RU 1 110 performs the primary handover procedure with the target eNB 300.

That is, the RU 1 110 and the target eNB 300 may perform a random-access procedure for the handover described above and perform handover to the target eNB 300 (step, S21040).

When the random-access procedure is completed, the RU 1 110 informs that the handover is completed by transmitting a complete message to the target eNB (step, S21050).

Later, as represented in Table 5 above, since the timing of starting control message for wireless connection and the data transmission and reception are set to "Immediately after completing primary handover", the RU 1 110 and the target eNB 300 transmit and receive the control message and data immediately after completing primary handover (step, S21060).

Like the RU 1 110, when the eNB identifies that the RU 2 120 moves to the coverage of the target eNB 300 based on the measurement information measured by the RU 2 120, the eNB may perform a handover procedure (secondary handover) to the target eNB with the RU 2 120 sequentially or independently with the primary handover.

The serving eNB 200 that determines to handover to the target eNB 300 for the RU 2 120 exchanges information (e.g., context information of the UE, capability information, radio link control scheme, RU for performing handover, whether to start transmission of control message and data and transmission start timing, environmental configuration information, information for random access, etc.) for the secondary handover of the RU 2 120 with the target eNB.

At this time, since the timing of starting a higher control message is set to "Immediately after completing next handover" as represented in Table 5 above, the target eNB 300 may transmit and receive the higher layer control message with the RU 1 110 when the transmission and reception of the information for the secondary handover with the serving eNB 200 is completed.

Later, the serving eNB 200 transmits the configuration information for the secondary handover to the RU 2 120 (step, S21070).

In this case, since handover to the target eNB of the RU 1 110 is already completed, the configuration information is transmitted to the UE through the RU 2 120.

Table 6 below represents an example of the configuration information for the secondary handover.

TABLE 6

| Field | Value |
|---|---|
| Radio link control scheme | Unit of RU |
| RU index | RU #2 |
| Whether to switch activation/inactivation | NO |
| Target eNB/cell | XX |
| Environmental information to be applied in target eNB/cell (e.g., CSI-report configuration) | |
| Whether to perform random access to target eNB/cell | NO |

The UE that receives the configuration information, in response to this, transmits a configuration complete message to the serving eNB 200 through the RU 2 120 (step, S21080).

Since the RU 1 110 performs handover to the target eNB already in the secondary handover, without any separate random-access procedure, the RU 2 120 may be available to handover to the target eNB.

That is, since uplink/downlink synchronization between the UE 100 and the target eNB 300 is established through the primary handover, any separate random-access procedure may not be performed.

Accordingly, as the configuration information represented in Table 6 above, the RU 2 120 is available to perform handover without performing any separate random-access procedure with the target eNB 300 and informs that the secondary handover is completed by transmitting a complete message to the target eNB (step, S21090).

Through the primary handover and the secondary handover, both of the RU 1 110 and the RU 2 120 move to the target eNB, and the UE may transmit and receive a control message and data with the target eNB through the RU 1 110 and the RU 2 120 (step, S21100).

Table 7 below represents an example of transmittable RU of a control message and data according to the primary handover and the secondary handover.

At this time, since both of the RU 1 110 and the RU 2 120 are included in the coverage of the serving eNB, the serving eNB may transmit the configuration information to the UE through an activated radio link between the RU 1 110 and the RU 2 120.

Table 8 below represents an example of the configuration information for the primary handover.

TABLE 8

| Field | Value |
|---|---|
| Radio link control scheme | Unit of RU |
| RU index | RU #1 |
| Whether to switch radio link connection/release | NO |
| Target eNB/cell | Target #2 |
| Environmental information to be applied in target eNB/cell (e.g., CSI-report configuration) | |

TABLE 7

| | | Primary cell in serving eNB | | | Primary cell in target eNB | | |
|---|---|---|---|---|---|---|---|
| | | Wireless connection control message | Higher layer control message | data | Wireless connection control message | Higher layer control message | data |
| Primary handover | Before | Transmission and reception through RU 1 & 2 | Transmission and reception through RU 1 & 2 | Transmission and reception through RU 1 & 2 | X | X | X |
| | Later | Transmission and reception through RU 2 | Transmission and reception through RU 2 | Transmission and reception through RU 2 | Transmission and reception through RU 1 | X | Transmission and reception through RU 2 |
| Secondary handover | Preparation step | Transmission and reception through RU 2 | DL: X UL: Transmission and reception through RU 2 | Transmission and reception through RU 2 | Transmission and reception through RU 1 | DL: Transmission and reception through RU 1 UL: X | Transmission and reception through RU 1 |
| | Later | X | X | X | Transmission and reception through RU 1 & 2 | Transmission and reception through RU 1 & 2 | Transmission and reception through RU 1 & 2 |

Figure 22:
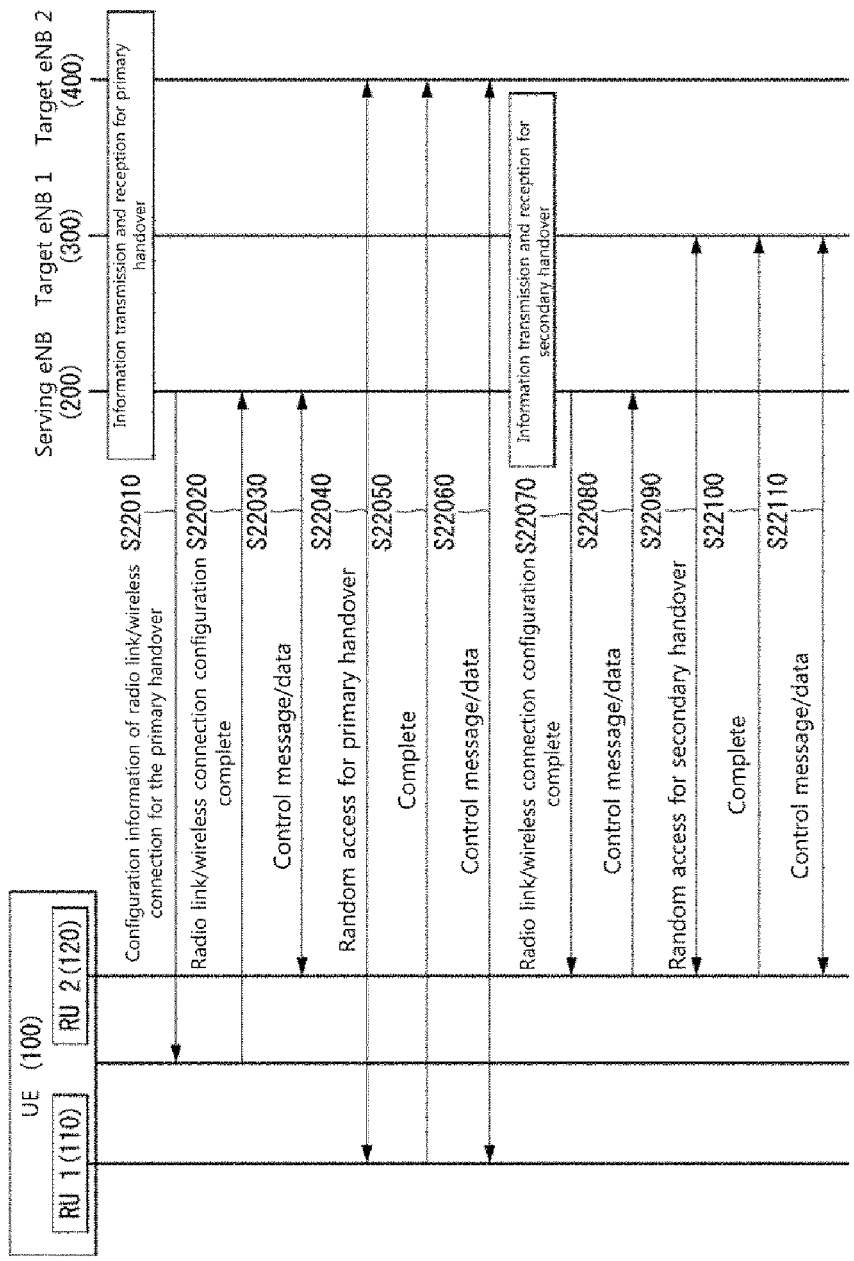
FIG. 22 is a flowchart illustrating an example of a method for a multiple antenna included in a UE to handover to different target eNBs to which the present invention may be applied.

FIG. 22 is a flowchart illustrating an example of a method for a multiple antenna included in a UE to handover to different target eNBs to which the present invention may be applied.

Referring to FIG. 22 above, a serving eNB may control multiple distributed radio antennas mounted on a UE individually to handover different target eNBs.

First, in FIG. 21, it is assumed that an RU 1 110 and an RU 2 120, which are distributed antennas, are mounted on a UE 100, and a primary cell of the RU 1 110 and the RU 2 120 is the same.

However, such an assumption is just for the convenience of description, but the present invention is not limited thereto.

Particularly, in the case that the UE 100 moves as shown in FIG. 20, a serving eNB 200 of a serving cell, which is the primary cell, may determine to control the UE in a unit of RU.

The serving eNB 2 400 that determines to handover to a target eNB 2 400 for the RU 1 110 exchanges information (e.g., context information of the UE, capability information, radio link control scheme, RU for performing handover, whether to start transmission of control message and data and transmission start timing, environmental configuration information, information for random access, etc.) for handover (primary handover) of the RU 1 110 with the target eNB.

Later, the serving eNB transmits the configuration information for the primary handover to the UE 100 (step, S22010).

TABLE 8-continued

| Field | Value |
|---|---|
| Whether to perform random access to target eNB/cell | YES |
| Random access information | |
| Whether to start control message for wireless connection (e.g., RRC message) | YES |
| Timing of starting control message for wireless connection | Immediately after completing primary handover |
| Whether to start higher control message (e.g., NAS message) | NO |
| Timing of starting higher control message (e.g., NAS message) | NULL |
| Whether to start data transmission and reception | YES |
| Timing of starting data transmission and reception | Immediately after completing primary handover |
| Information of data transmission and reception (e.g., Bearer ID) | |

The UE 100 that receives the configuration information transmits a configuration complete message to the serving eNB 200 through the RU 1 110 and the RU 2 120 (step, S22020).

After transmitting the configuration complete message, the serving eNB 200 transmits and receives a control message and data only with the RU 2 120 of the UE 100 (step, S22030).

Independently with the step S22030, the RU 1 110 performs the primary handover procedure with the target eNB 2 400.

That is, the RU 1 110 and the target eNB 300 may perform a random-access procedure for the handover described above and perform handover to the target eNB 2 400 (step, S22040).

When the random-access procedure is completed, the RU 1 110 informs that the handover is completed by transmitting a complete message to the target eNB 2 400 (step, S22050).

Later, as represented in Table 8 above, since the timing of starting control message for wireless connection and the data transmission and reception are set to "Immediately after completing primary handover", the RU 1 110 and the target eNB 2 400 transmit and receive the control message and data immediately after completing primary handover (step, S22060).

The RU 2 120 performs handover to a target eNB different from that of the RU 1 110.

For example, in the case that the RU 2 120 and the RU 1 110 belong to coverages of different cells with each other or belong to an area on which cell coverages of multiple cells are overlapped, the RU 2 120 may perform handover to a target eNB different from that of the RU 1 110.

That is, the RU 2 120 may perform handover to a target eNB 1 300, not the target eNB 2 400 independently (or without regard to an order) with the RU 1 110.

The serving eNB 200 that determines to handover to the target eNB 1 300 for the RU 2 120 exchanges information (e.g., context information of the UE, capability information, radio link control scheme, RU for performing handover, whether to start transmission of control message and data and transmission start timing, environmental configuration information, information for random access, etc.) for the secondary handover of the RU 2 120 with the target eNB 1 300.

Later, the serving eNB 200 transmits the configuration information for the secondary handover to the RU 2 120 (step, S22070).

In this case, since handover to the target eNB 2 400 of the RU 1 110 is already completed, the configuration information is transmitted to the UE through the RU 2 120.

Table 9 below represents an example of the configuration information for the secondary handover.

TABLE 9

| Field | Value |
| --- | --- |
| Radio link control scheme | Unit of RU |
| RU index | RU #1 |
| Whether to switch radio link connection/release | NO |
| Target eNB/cell | Target #1 |
| Environmental information to be applied in target eNB/cell (e.g., CSI-report configuration) | |
| Whether to perform random access to target eNB/cell | YES |
| Random access information | |
| Whether to start control message for wireless connection (e.g., RRC message) | YES |
| Timing of starting control message for wireless connection | Immediately after completing secondary handover |
| Whether to start higher control message (e.g., NAS message) | YES |
| Timing of starting higher control message (e.g., NAS message) | Immediately after completing secondary handover |
| Whether to start data transmission and reception | YES |
| Timing of starting data transmission and reception | Immediately after completing secondary handover |

TABLE 9-continued

| Field | Value |
| --- | --- |
| Information of data transmission and reception (e.g., Bearer ID) | |

The RU 2 120 that receives the configuration information, in response to this, transmits a configuration complete message to the serving eNB 200 (step, S22080).

The RU 2 120 may perform handover to the target eNB 1 300 by performing a random-access procedure like in the primary handover (step, S22090).

When the random-access procedure is completed, the RU 2 120 transmits a complete message to the target eNB 1 300 and informs that handover is completed (step, S22100).

Later, as represented in Table 9 above, since the starting timing of the control message for wireless connection, the control message (e.g., NAS message) of a higher layer and data is set to "Immediately after completing secondary handover", the RU 1 110 and the target eNB 300 transmit and receive the control message and data immediately after the secondary handover is completed (step, S22110).

Through such a method, the serving eNB may control the multiple distributed antennas mounted on the same UE to handover to different target eNBs with each other.

Figure 23:
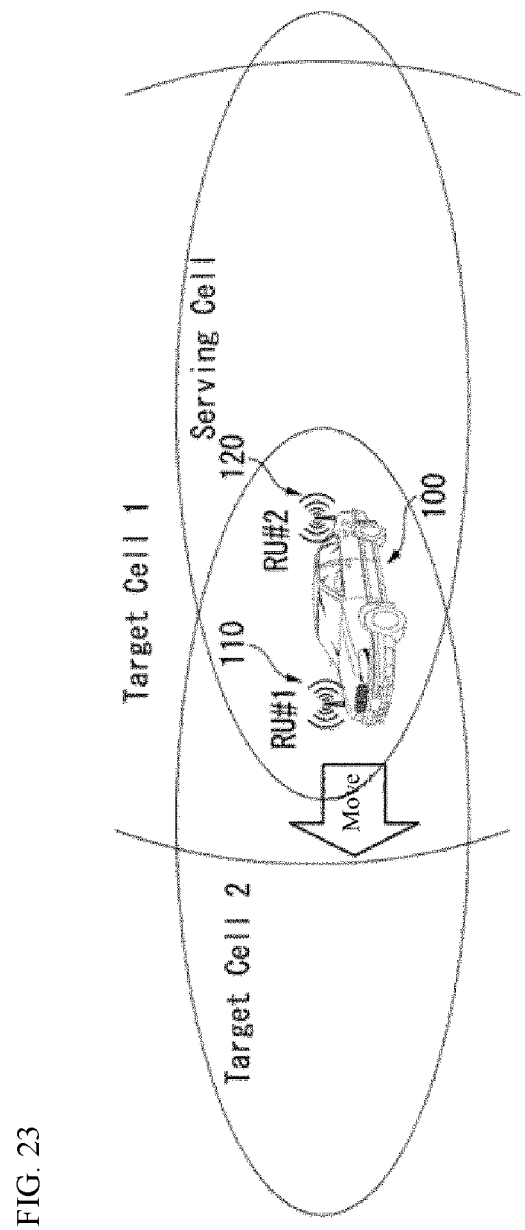
FIGS. 23 and 24 are diagrams illustrating an example of a method for a multiple antenna included in a UE to handover to different target eNBs to which the present invention may be applied.
Figure 24:
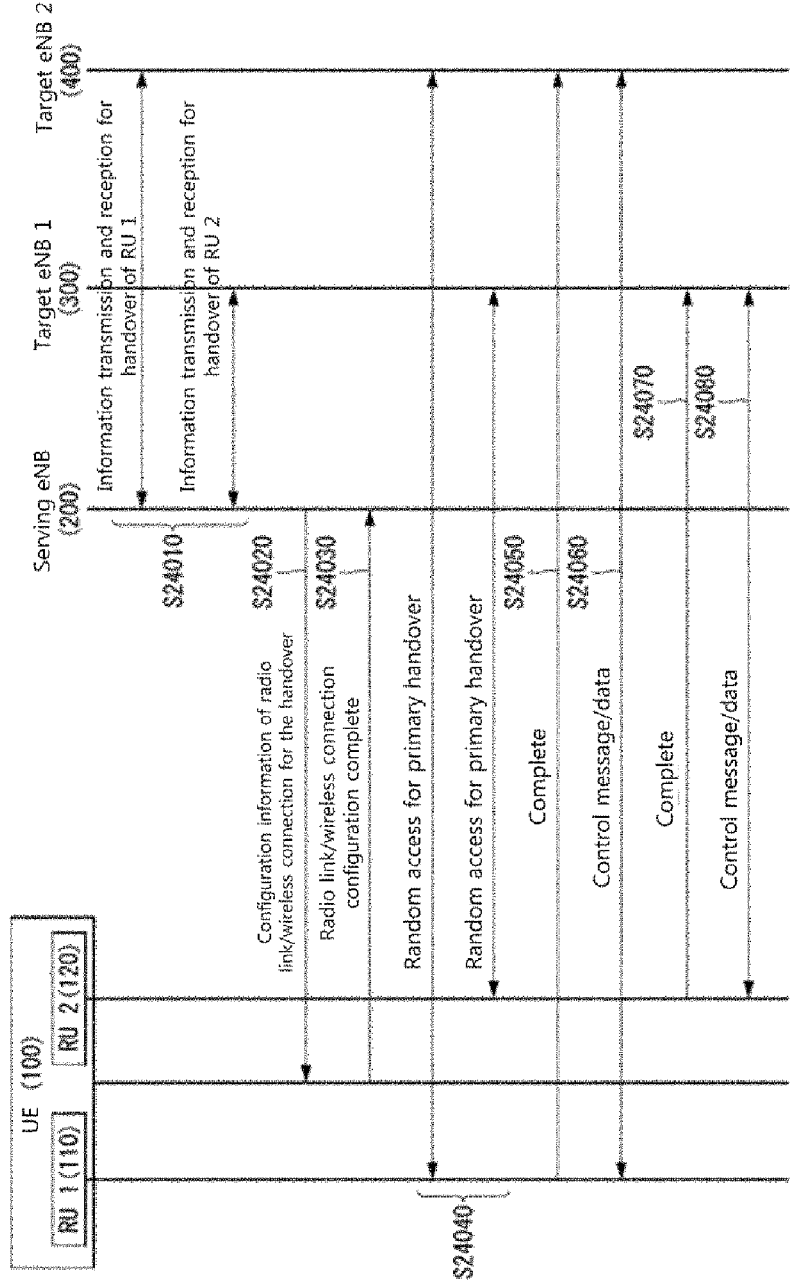

FIGS. 23 and 24 are diagrams illustrating an example of a method for a multiple antenna included in a UE to handover to different target eNBs to which the present invention may be applied.

Referring to FIG. 23 above, in the case that multiple distributed antennas mounted on a UE are included in a plurality of cell coverages simultaneously, an eNB of a serving cell may control the multiple distributed antennas individually and control to perform handover to eNBs of different target cells on the same timing.

First, in FIG. 23 and FIG. 24, it is assumed that an RU 1 110 and an RU 2 120, which are distributed antennas, are mounted on a UE 100, and a primary cell of the RU 1 110 and the RU 2 120 is the same.

However, such an assumption is just for the convenience of description, but the present invention is not limited thereto.

Particularly, as shown in FIG. 23, in the case that the UE 100 moves as shown in FIG. 23, in the case that the UE 100 mounted with the RU 1 110 and the RU 2 120 moves in coverage of a serving cell and is included in the coverages of target cell 1 and target cell 2 simultaneously, the serving eNB of the serving cell may control the RU 1 110 to handover to the target eNB of the target cell 2 (target eNB 2) and control the RU 2 120 to handover to the target eNB of the target cell 1 (target eNB 1).

The serving eNB 2 400 that determines to handover to the target eNB 2 400 for the RU 1 110 and handover to the target eNB 1 300 for the RU 2 120 exchanges information (e.g., context information of the UE, capability information, radio link control scheme, RU for performing handover, whether to start transmission of control message and data and transmission start timing, environmental configuration information, information for random access, etc.) for the respective handovers (hereinafter, referred to as a first handover and a second handover) with the respective target eNBs (step, S24010).

Later, the serving eNB transmits the configuration information for the first handover and the second handover to the UE 100 (step, S24020).

At this time, since both the RU 1 110 and the RU 2 120 are included in the coverage of the serving eNB 200, the serving eNB 200 may transmit the configuration information to the UE through an activated radio link between the RU 1 110 and the RU 2 120.

Table 10 below represents an example of the configuration information.

TABLE 10

| Field | Value when i = 0 (configuration for RU #1) | Value when i = 1 (configuration for RU #2) |
|---|---|---|
| Radio link control scheme | Unit of RU | |
| RU index | RU #1 | RU #2 |
| Whether to switch radio link connection/release | NO | NO |
| Target eNB/cell | Target #2 | Target #1 |
| Environmental information to be applied in target eNB/cell (e.g., CSI-report configuration) | | |
| Whether to perform random access to target eNB/cell | YES | YES |
| Random access information | | |
| Whether to start control message for wireless connection (e.g., RRC message) | YES | YES |
| Timing of starting control message for wireless connection | Immediately after completing first handover | Immediately after completing second handover |
| Whether to start higher control message (e.g., NAS message) | NO | YES |
| Timing of starting higher control message (e.g., NAS message) | NULL | Immediately after completing second handover |
| Whether to start data transmission and reception | YES | YES |
| Timing of starting data transmission and reception | Immediately after completing first handover | Immediately after completing second handover |
| Information of data transmission and reception (e.g., Bearer ID) | | |

The UE 100 that receives the configuration information transmits a configuration complete message to the serving eNB 200 through the RU 1 110 and the RU 2 120 (step, S24030).

Based on the configuration information, the RU 1 110 performs the first handover with the target eNB 2 400, and the RU 2 120 performs the second handover with the target eNB 1 300.

That is, the RU 1 110 and the target eNB 2 400 perform a random-access procedure for the handover and perform handover to the target eNB 2 400, and the RU 2 120 and the target eNB 1 300 perform a random-access procedure for the handover and perform handover to the target eNB 1 300 (step, S24040).

When the random-access procedure for the first handover is completed, the RU 1 110 informs that the handover is completed by transmitting a complete message to the target eNB 2 400 (step, S24050).

Later, as represented in Table 10 above, since the timing of starting control message for wireless connection and the data transmission and reception are set to "Immediately after completing first handover", the RU 1 110 and the target eNB 2 400 transmit and receive the control message and data immediately after completing the first handover (step, S24060).

Similarly, when the random-access procedure for the second handover is completed, the RU 2 120 informs that the handover is completed by transmitting a complete message to the target eNB 1 300 (step, S24070).

Later, as represented in Table 10 above, since the timing of starting control message for wireless connection and the data transmission and reception are set to "Immediately after completing second handover", the RU 2 120 and the target eNB 1 300 transmit and receive the control message and data immediately after completing the second handover (step, S24080).

At this time, the step S24050 and the step S24070 may be performed simultaneously with or independently from the step S24080.

As another embodiment of the present invention, the handover between eNBs described in FIG. 21 to FIG. 24 above may be applied to handover between cells in the same eNB. Accordingly, the eNB may control configuration of radio link and wireless connection for handover to the same or different cell on the same timing or different timing in a unit of RU.

Figure 25:
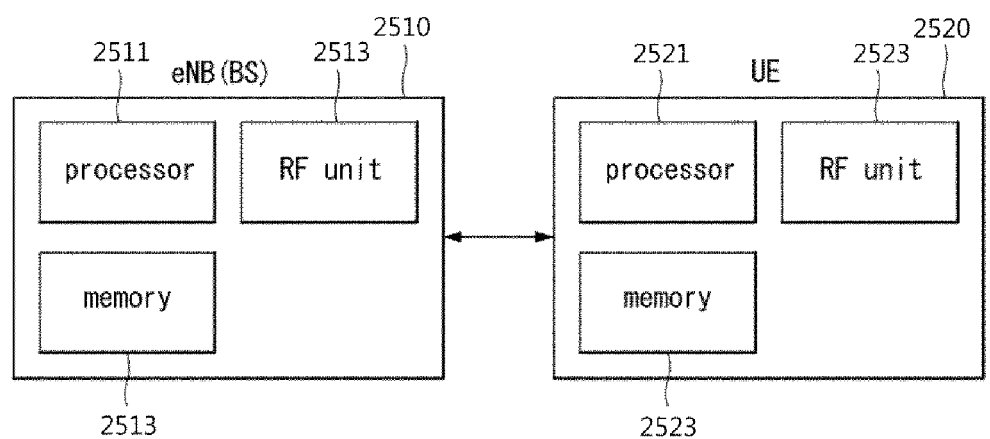
FIG. 25 is a diagram illustrating an example of the internal block diagram of a wireless device to which the present invention may be applied.

FIG. 25 is a diagram illustrating an example of the internal block diagram of a wireless device to which the present invention may be applied.

In this case, the wireless device may be an eNB and a UE, and the eNB includes both a macro eNB and a small eNB.

As shown in FIG. 25, the eNB 2510 and the UE 2520 include communication units (or transmission/reception units or RF units) 2513 and 2523, processors 2511 and 2521, and memories 2512 and 2522, respectively.

In addition, each of the eNB and the UE may further include an input unit and an output unit.

The communication unit 2513 or 2523, the processor 2511 or 2521, the input unit, the output unit, and the memory 2512 or 2522 are functionally coupled in order to perform the methods proposed in this specification.

When receiving information produced by a physical layer (PHY) protocol, the communication unit (or the transmission/reception unit or the RF unit) 2513 or 2523 moves the received information to a Radio-Frequency (RF) spectrum, performs filtering and amplification on the information, and sends the signal to an antenna. Furthermore, the communication unit moves the RF signal, received from the antenna, to a band that may be processed in the PHY protocol and performs filtering on the RF signal.

Furthermore, the communication unit may have a switch function for changing such transmission and reception functions.

In addition, in the present invention, the UE 2520 may include at least one communication unit 2523.

The processor 2511 or 2521 implements the functions, processes and/or methods proposed in this specification. The layers of a radio interface protocol may be implemented by the processor.

The processor may be represented as a control unit, a controller, a control unit, or a computer.

The memory 2512 or 2522 is connected to the processor and stores protocols or parameters for performing an uplink resource allocation method.

The processor 2511 or 2521 may include application-specific integrated circuits (ASICs), other chipsets, logic circuits and/or data processing devices. The memory may include read-only memory (ROM), random access memory (RAM), flash memory, a memory card, a storage medium and/or other storage devices. The communication unit may include baseband circuits for processing radio signals. When an embodiment is implemented in software, the method may be implemented as a module process or function for performing the functions.

The module may be stored in the memory and may be executed by the processor. The memory may be positioned inside or outside the processor and may be connected to the processor by well-known means.

The output unit (or display unit or indication unit) is controlled by the processor and outputs information output by the processor along with a key entry signal generated from a key input unit and various information signals from the processor.

Furthermore, the drawings have been divided and described for convenience of description, but the embodiments described with reference to the drawings may be merged to implement a new embodiment. Furthermore, the scope of the present invention also includes designing a computer-readable recording medium in which a program for executing the above-described embodiments has been written according to the needs of those skilled in the art.

The method for transmitting and receiving reference signals according to this specification is not limitedly applied to the configurations and methods of the aforementioned embodiments, but some or all of the embodiments may be selectively combined and configured so that the embodiments are modified in various ways.

Meanwhile, the method for transmitting and receiving reference signals according to this specification may be implemented in a recording medium, readable by a processor included in a network device, in the form of code readable by the processor. The processor-readable recording medium includes all types of recording devices in which data readable by a processor is stored. The processor-readable recording medium may include ROM, RAM, CD-ROM, magnetic tapes, floppy disks, and optical data storages, for example. Furthermore, the processor-readable recording medium may be implemented in the form of carrier waves, such as transmission over the Internet. Furthermore, the processor-readable recording medium may be distributed to computer systems connected over a network, and code readable by a processor may be stored in the processor-readable recording medium and executed in a distributed manner.

In addition, although the preferred embodiments of this specification have been illustrated and described above, this specification is not limited to the above-described specific embodiments, and a person having ordinary skill in the art to which the present invention pertains may modify the present invention in various ways without departing from the gist of the present invention in the claims. Such modified embodiments should not be individually understood from the technical spirit or prospect of the present invention.

Furthermore, in this specification, both the apparatus invention and the method invention have been described, but the descriptions of both the inventions may be complementally applied, if necessary.

INDUSTRIAL APPLICABILITY

The RRC connection method in a wireless communication system of the present invention has been illustrated as being applied to the 3GPP LTE/LTE-A system but may also be applied to various wireless communication systems in addition to the 3GPP LTE/LTE-A system.

The invention claimed is:

1. A method for performing a measurement in a wireless communication system, the method performed by a device and comprising:
    receiving, from a base station, a request message requesting capability information of the device;
    transmitting, to the base station, a response message including the capability information;
    receiving first configuration information for a measurement configuration for two or more radio units included in the device based on the capability information,
    wherein each of the two or more radio units represents a unit available to perform transmission and reception of a signal and a measurement of signal strength individually;
    measuring a serving cell and neighboring cells through each of the two or more radio units; and
    transmitting, to the base station, a reporting message including measurement information related to measurement values,
    wherein each of the measurement values is measured by each of the two or more radio units,
    wherein based on the measurement values measured by each of the two or more radio units being different from each other, radio links of the two or more radio units are individually controlled, and
    wherein based on the measurement values measured by each of the two or more radio units being same as each other, radio links of the two or more radio units are controlled in a same manner.

2. The method of claim 1, wherein the capability information includes at least one of (i) radio access technology (RAT)-type, (ii) whether the device includes a plurality of radio units, (iii) a number of the radio units, or (iv) information related to each of the radio units.

3. The method of claim 2, wherein the information related to each of the radio units includes at least one of (i) an index of the radio unit, (ii) whether to activate radio link or wireless connection, (iii) a category, or (iv) a physical layer or Radio Frequency (RF) parameter.

4. The method of claim 1, wherein the first configuration information includes at least one of (i) a condition for transmitting the measurement information for each of the radio units to the base station, (ii) a transmission period of the measurement information, or (iii) whether the measurement information is transmitted together with the measurement information of another radio unit.

5. The method of claim 1, wherein the reporting message is transmitted by each of the radio units separately.

6. The method of claim 1, wherein the reporting message is transmitted by one of the two or more radio units, and
wherein the measurement information includes an index for each of the radio units and a measurement value according to the index.

7. The method of claim 1, wherein a part of the two or more radio units is in radio link connected state, and the remaining radio unit is in radio link released state.

8. The method of claim 1, further comprising performing handover to at least one target cell among the neighboring cells based on the measurement information.

9. The method of claim 8, wherein the two or more radio units perform handover to a same target cell among the at least one target cell.

10. The method of claim 9, wherein the step of performing handover further includes receiving, from the base station, second configuration information for a wireless connection with the target cell,
wherein the second configuration information includes at least one of a control scheme for the two or more radio units, an index for a radio unit to be switched to a connected state of radio link, an index for a radio unit to be switched to a released state of radio link, target cell information, random access information or environmental configuration information for each of the radio units.

11. The method of claim 9, wherein the step of performing handover further includes performing, by one of the two or more radio units, a random-access procedure with the target cell,
wherein the remaining radio units among the two or more radio units does not perform a random-access procedure with the target cell.

12. The method of claim 1, further comprising:
performing, by a first radio unit among the two or more radio units, handover to a first target cell based on the measurement information; and
performing, by a second radio unit among the two or more radio units, handover to a second target cell based on the measurement information.

13. The method of claim 12, wherein the step of performing handover to the first target cell further includes receiving second configuration information for a wireless connection with the first target cell,
wherein the second configuration information includes at least one of a control scheme for the two or more radio units, an index for a radio unit to be switched to a connected state of radio link, an index for a radio unit to be switched to a released state of radio link, target cell information, random access information, whether to start a control message for the wireless connection, a transmission timing of the control message, whether to start transmission and reception of data with the first target cell, a starting timing of transmission and reception of data or information for the transmission and reception of data.

14. The method of claim 12, wherein the step of performing handover to the second target cell further includes receiving second configuration information for a wireless connection with the second target cell through the second radio unit,
wherein the second configuration information includes at least one of a control scheme for the two or more radio units, an index for a radio unit to be switched to a connected state of radio link, an index for a radio unit to be switched to a released state of radio link, target cell information, random access information, whether to start a control message for the wireless connection, a transmission timing of the control message, whether to start transmission and reception of data with the second target cell, a starting timing of transmission and reception of data or information for the transmission and reception of data.

15. A device configured to perform a measurement in a wireless communication system, the device comprising:
two or more radio units; and
a processor functionally connected with the two or more radio units to control the two or more radio units,
wherein the processor is configured to control to:
receive, from a base station, a request message requesting capability information of the device;
transmit, to the base station, a response message including the capability information;
receive first configuration information for a measurement configuration for two or more radio units included in the device based on the capability information,
wherein each of the two or more radio units represents a unit available to perform transmission and reception of a signal and a measurement of signal strength individually;
measure a serving cell and neighboring cells through each of the two or more radio units; and
transmit, to the base station, a reporting message including measurement information related to measurement values,
wherein each of the measurement values is measured by each of the two or more radio units,
wherein based on the measurement values measured by each of the two or more radio units being different from each other, radio links of the two or more radio units are individually controlled, and
wherein based on the measurement values measured by each of the two or more radio units being same as each other, radio links of the two or more radio units are controlled in a same manner.

* * * * *